(12) United States Patent
Yamada

(10) Patent No.: US 8,537,448 B2
(45) Date of Patent: Sep. 17, 2013

(54) MIRROR ACTUATOR AND BEAM IRRADIATION DEVICE

(75) Inventor: Masato Yamada, Inuyama (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 144 days.

(21) Appl. No.: 13/334,745

(22) Filed: Dec. 22, 2011

(65) Prior Publication Data
US 2012/0162740 A1    Jun. 28, 2012

(30) Foreign Application Priority Data

Dec. 24, 2010   (JP) ................................. 2010-288848
May 27, 2011   (JP) ................................. 2011-119781

(51) Int. Cl.
*G02B 26/08*    (2006.01)

(52) U.S. Cl.
USPC ..................................................... 359/199.3

(58) Field of Classification Search
USPC .......... 359/199.1, 199.3, 212.1, 212.2, 213.1, 359/214.1, 221.1, 223.1–226.1
See application file for complete search history.

(56) References Cited

U.S. PATENT DOCUMENTS
2008/0100899 A1*   5/2008   Shimokawa et al. ...... 359/225.1

FOREIGN PATENT DOCUMENTS
JP            2009-14698 A      1/2009

* cited by examiner

*Primary Examiner* — Euncha Cherry
(74) *Attorney, Agent, or Firm* — Ditthavong Mori & Steiner, P.C.

(57) ABSTRACT

A mirror actuator has a first pivot portion which is pivotally supported on a base member, and a second pivot portion which is pivotally supported on the first pivot portion. A mirror is disposed in the second pivot portion. A first coil is disposed in the first pivot portion, and a second coil is disposed in the second pivot portion. A first elastic member connects between the base member and the first pivot portion. A second elastic member connects between the first pivot portion and the second pivot portion. The first elastic member and the second elastic member are connected by a circuit pattern. With the provision of the first elastic member, the second elastic member and the circuit pattern, a current is supplied to the first coil and to the second coil.

18 Claims, 13 Drawing Sheets

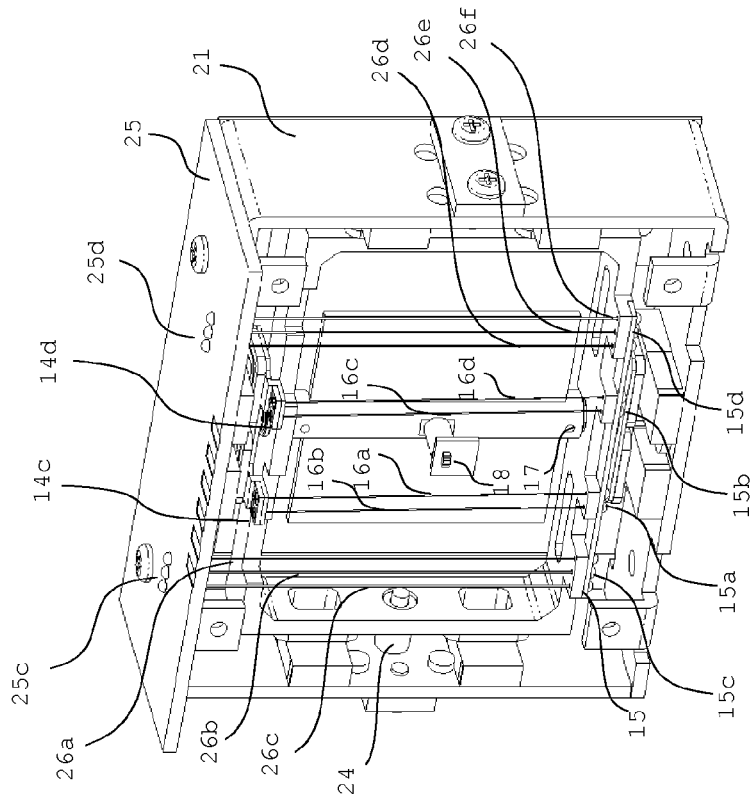
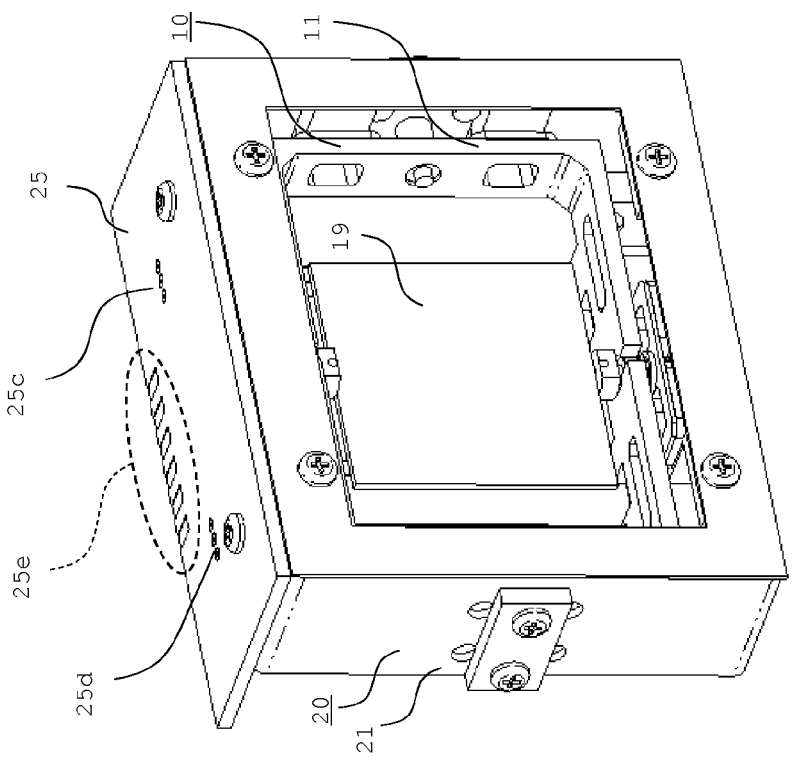

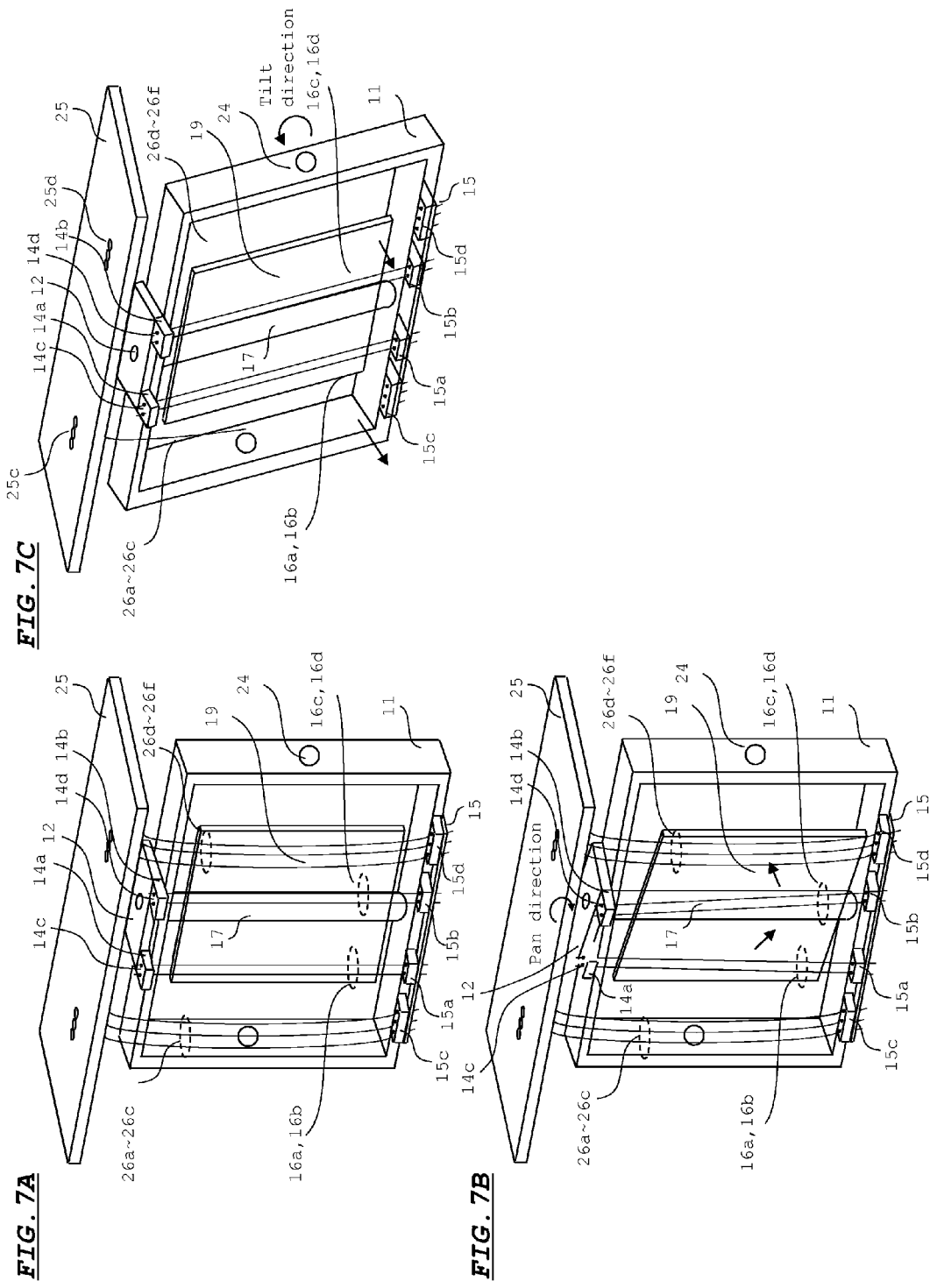

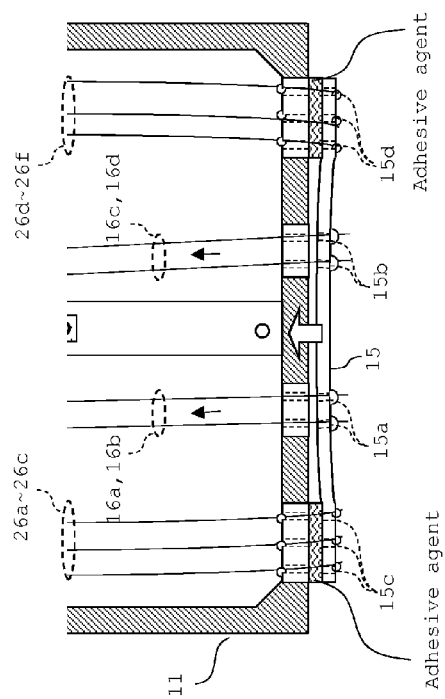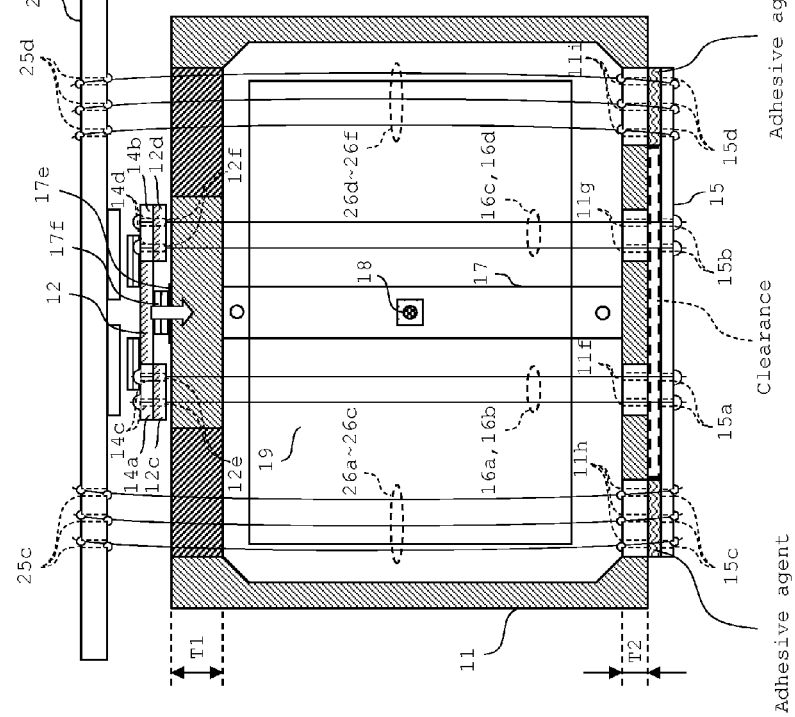

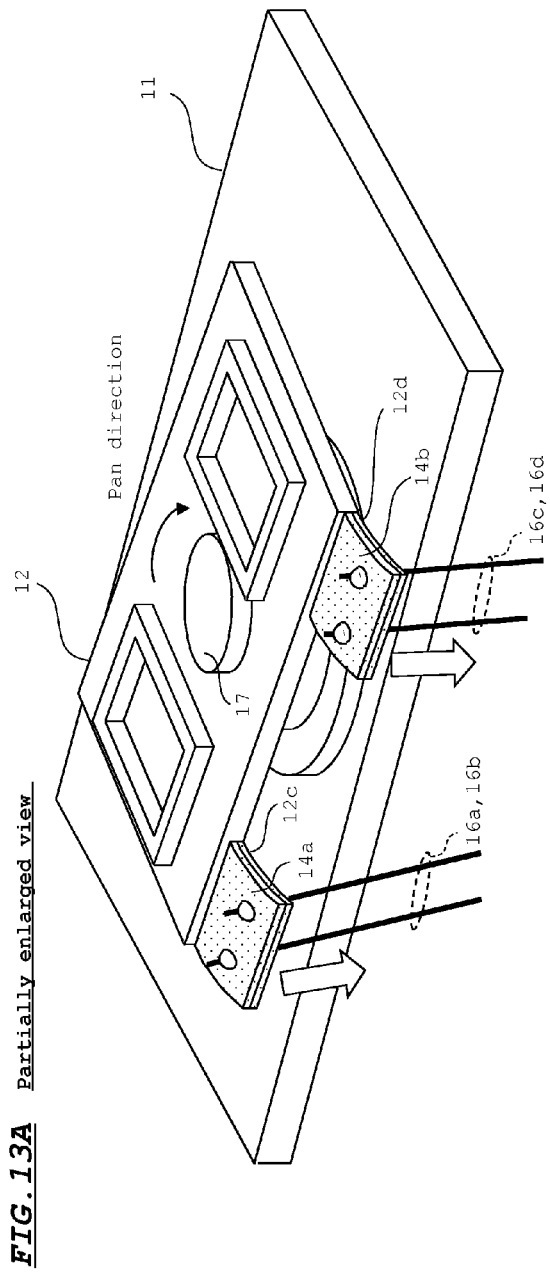
FIG.13A  Partially enlarged view
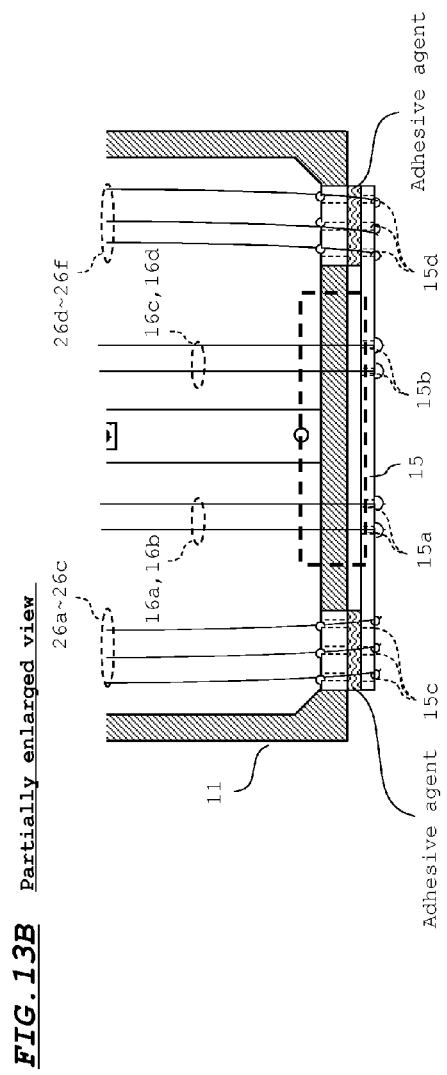
FIG.13B  Partially enlarged view

MIRROR ACTUATOR AND BEAM IRRADIATION DEVICE This application claims priority under 35 U.S.C. Section 119 of Japanese Patent Application No. 2010-288848 filed Dec. 24, 2010, entitled "MIRROR ACTUATOR AND BEAM IRRADIATION DEVICE" and Japanese Patent Application No. 2011-119781 filed May 27, 2011, entitled "MIRROR ACTUATOR AND BEAM IRRADIATION DEVICE". The disclosures of the above applications are incorporated herein by reference.

BACKGROUND OF THE INVENTION

1. Field of the Invention

The present invention relates to a mirror actuator for pivotally moving a mirror about two pivot axes, and a beam irradiation device loaded with the mirror actuator.

2. Disclosure of Related Art

In recent years, a laser radar system has been loaded in a family automobile or a like vehicle to enhance security in driving. Further, the laser radar system has also been used as security measures such as detecting intrusion into a building. Generally, the laser radar system is so configured as to scan a target area with laser light to detect presence or absence of an obstacle at each of scanning positions, based on presence or absence of reflected light at each of the scanning positions. The laser radar system is also configured to detect a distance to the obstacle at each of the scanning positions, based on a required time from an irradiation timing of laser light to a light receiving timing of reflected light at each of the scanning positions.

As an actuator for scanning a target area with laser light, for instance, there may be used a mirror actuator employing a moving coil system configured in such a manner that a mirror is pivotally moved about two pivot axes. In the case where such a mirror actuator is used, laser light is entered into a mirror in an oblique direction. In this arrangement, if the mirror is pivotally moved about two pivot axes in a horizontal direction and in a vertical direction, laser light swings in the horizontal direction and in the vertical direction within the target area.

In the mirror actuator configured as described above, since a driving coil is disposed in a movable portion, it is necessary to supply a current to the driving coil via a cable, a harness or a like member. In this case, however, the cable, the harness or the like member may be flexed as the movable portion pivotally moves, and unstable load may be exerted on the movable portion, which may lower the precision in pivotally moving the mirror.

SUMMARY OF THE INVENTION

A first aspect of the invention relates to a mirror actuator. The mirror actuator according to the first aspect includes a base member; a first pivot portion which is supported on the base member to be pivotally movable about an axis of a first pivot shaft; a second pivot portion which is supported on the first pivot portion to be pivotally movable about an axis of a second pivot shaft perpendicular to the first pivot shaft; a mirror which is disposed in the second pivot portion; a first coil which is pivotally moved with the first pivot portion; a second coil which is pivotally moved with the second pivot portion; a magnet portion which supplies a magnetic field to the first coil and to the second coil; a plurality of first elastic members which connect between the base member and the first pivot portion, and have flexibility and conductivity; a plurality of second elastic members which connect between the first pivot portion and the second pivot portion, and have flexibility and conductivity; and a circuit pattern which connects between one of joint portions between the first elastic members and the first pivot portion, and one of joint portions between the second elastic members and the first pivot portion. In this arrangement, the circuit pattern is configured in such a manner that a current flows from the first elastic member for supplying a signal to the second coil to the second elastic member for supplying a signal to the second coil, and the first coil is connected to an end of the first elastic member, corresponding to the side of the first pivot portion, for supplying a signal to the first coil, and the second coil is connected to an end of the second elastic member, corresponding to the side of the second pivot portion, for supplying a signal to the second coil.

A second aspect of the invention relates to a beam irradiation device. The beam irradiation device according to the second aspect includes a mirror actuator having substantially the same arrangement as the mirror actuator according to the first aspect, and a laser light source which supplies laser light to a mirror of the mirror actuator.

BRIEF DESCRIPTION OF THE DRAWINGS

These and other objects, and novel features of the present invention will become more apparent upon reading the following detailed description of the embodiment along with the accompanying drawings.

FIGS. 4A and 4B are diagrams showing the process of assembling the mirror actuator in the embodiment.

FIGS. 7A through 7C are diagrams showing an operation in pivotally moving the mirror actuator in the embodiment.

FIGS. 8A through 8C are diagrams showing a connecting status between a mirror unit frame and suspension wires in the embodiment.

FIGS. 13A, 13B are diagrams showing an arrangement of a mirror actuator as a modification example.

Figure 1:
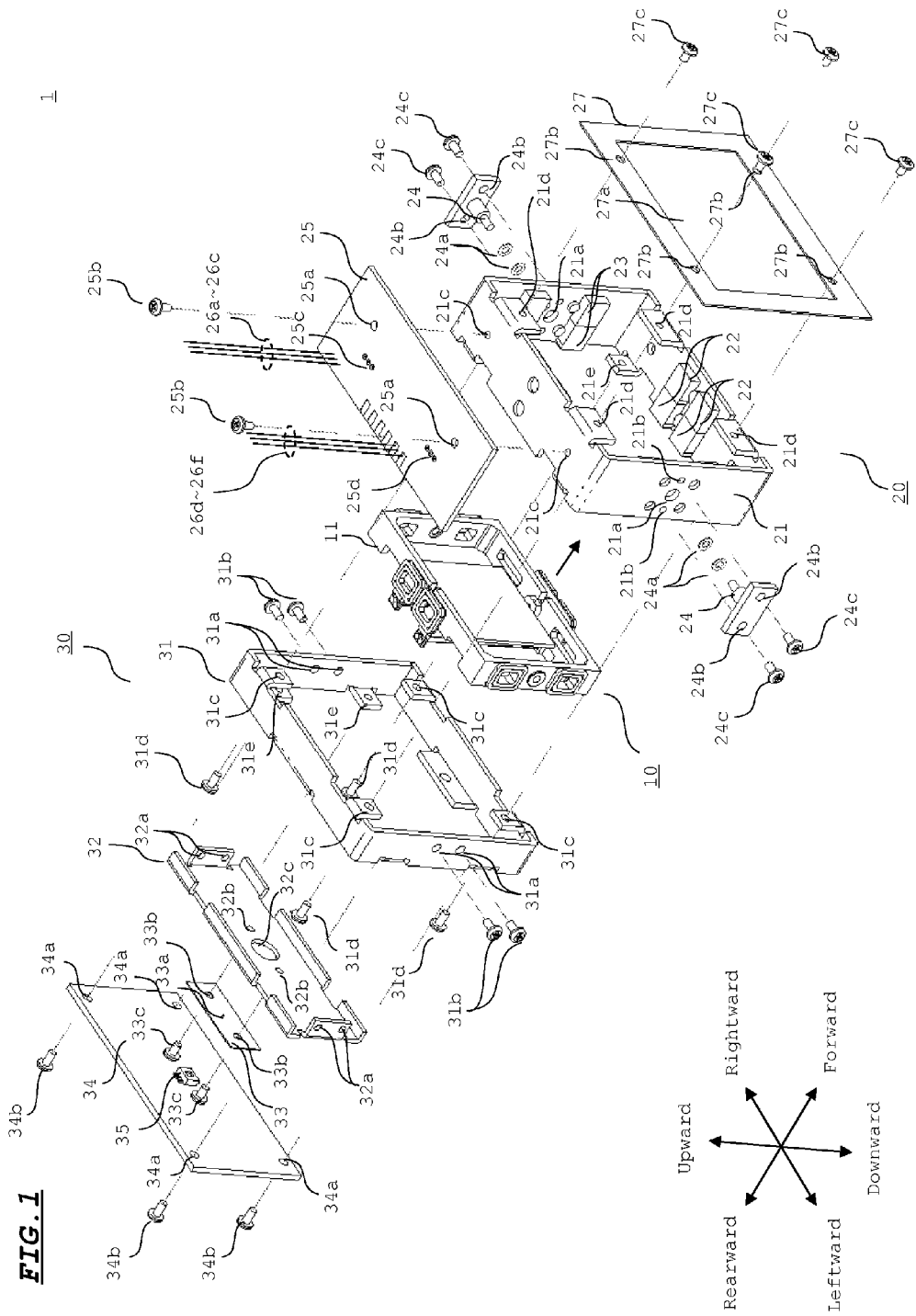
FIG. 1 is an exploded perspective view of a mirror actuator embodying the invention.

The drawings are provided mainly for describing the present invention, and do not limit the scope of the present invention.

DESCRIPTION OF PREFERRED EMBODIMENTS

In the following, an embodiment of the invention is described referring to the drawings. In the embodiment, a magnet unit 20 corresponds to a "base member" in the claims. Support shafts 24 correspond to a "first pivot shaft" in the claims. A mirror unit frame 11 corresponds to a "first pivot portion" in the claims. A support shaft 17 corresponds to a "second pivot shaft" and a "second pivot portion" in the claims. Pan coil attachment plates 12, 13 correspond to the "second pivot" portion in the claims. Tilt coils 11b correspond to a "first coil" in the claims. Pan coils 13b correspond to a "second coil" in the claims. Pan magnets 22 and tilt magnets 23 correspond to a "magnet portion" in the claims. Suspension wires 26a through 26f correspond to "first elastic members" in the claims. Suspension wires 16a through 16d correspond to "second elastic members" in the claims. Terminal holes 15a through 15d correspond to "joint portions" in the claims. Circuit patterns P1 through P4 correspond to a "circuit pattern" in the claims. A suspension wire fixing substrate 15 corresponds to a "fixing member" in the claims. Substrate attachment portions 12c, 12d, suspension wire fixing substrates 14a, 14b and the suspension wire fixing substrate 15 correspond to "connecting portions" in the claims. Polyslider washers 17f correspond to a "sliding contact member" in the claims. The description regarding the correspondence between the claims and the embodiment is merely an example, and the claims are not limited by the description of the embodiment.

Figure 2:
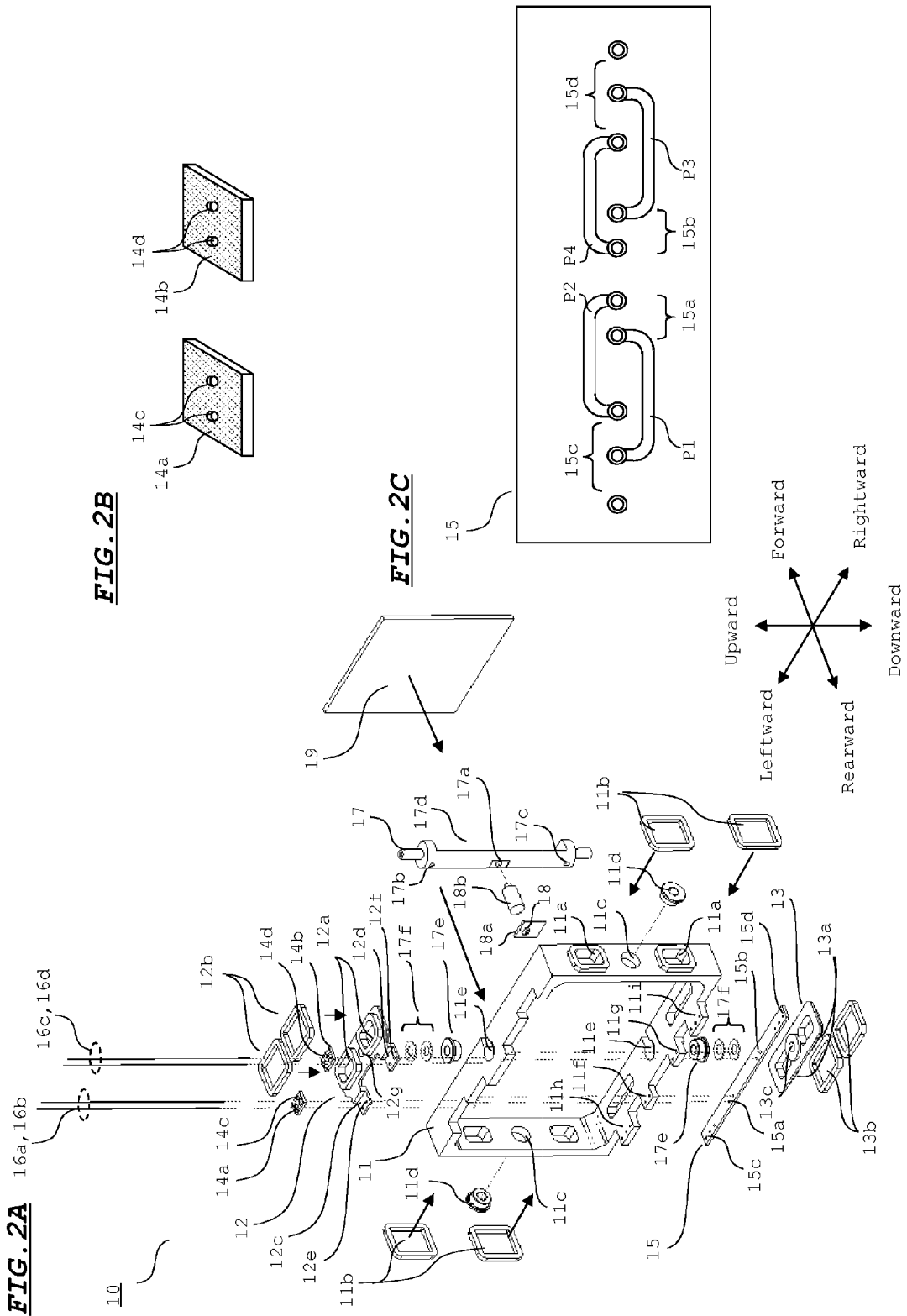
FIGS. 2A through 2C are diagrams showing a process of assembling the mirror actuator in the embodiment.

FIG. 1 is an exploded perspective view of a mirror actuator 1 embodying the invention, and FIG. 2A is an exploded perspective view of a mirror unit 10 in the embodiment.

The mirror actuator 1 is provided with the mirror unit 10, a magnet unit 20, and a servo unit 30.

Referring to FIG. 2A, the mirror unit 10 is provided with a mirror unit frame 11, pan coil attachment plates 12, 13, suspension wire fixing substrates 14a, 14b, 15, suspension wires 16a through 16d, a support shaft 17, an LED 18, and a mirror 19.

The mirror unit frame 11 is constituted of a frame member having a rectangular shape in front view. The mirror unit frame 11 is made of a lightweight resin or a like material. The mirror unit frame 11 is formed with two tilt coil attachment portions 11a at each of left and right surfaces thereof. The tilt coil attachment portions 11a at each of the left and right surfaces are disposed vertically symmetrical to each other with respect to a center of each of the left and right surfaces. A tilt coil 11b is wound around and fixedly mounted on each of the four tilt coil attachment portions 11a.

The mirror unit frame 11 is further formed with laterally aligned shaft holes 11c, and vertically aligned grooves 11e. The shaft holes 11c are disposed at center positions on the left and right surfaces of the mirror unit frame 11, and the grooves 11e extend to center positions on top and bottom surfaces of the mirror unit frame 11. Bearings 11d are mounted in the shaft holes 11c from the left side and the right side.

A bottom surface of the mirror unit frame 11 has a comblike shape; and is formed with two wire holes 11f for passing through the suspension wires 16a, 16b, two wire holes 11g for passing through the suspension wires 16c, 16d, three wire holes 11h for passing through suspension wires 26a through 26c to be described later, and three wire holes 11i for passing through suspension wires 26d through 26f to be described later. The wire holes 11h, 11i have a diameter slightly larger than the diameter of the suspension wires 26a through 26f to fixedly mount the suspension wires 26a through 26f with an inclination obliquely rearwardly. With this arrangement, it is possible to wind the suspension wires 26a through 26f with a curved shape in a direction away from the mirror 19.

The pan coil attachment plates 12, 13 are made of aluminium, and have excellent resistance against flexure. The pan coil attachment plate 12 is formed with two pan coil attachment portions 12a, a substrate attachment portion 12c for mounting the suspension wire fixing substrate 14a, a substrate attachment portion 12d for mounting the suspension wire fixing substrate 14b, two wire holes 12e for passing through the suspension wires 16a, 16b, two wire holes 12f for passing through the suspension wires 16c, 16d, and a shaft hole 12g for passing through the support shaft 17. The substrate attachment portions 12c, 12d are formed into a step portion lower than the body of the pan coil attachment plate 12. The wire holes 12e are vertically and linearly aligned with respect to the wire holes 11f; and the wire holes 12f are vertically and linearly aligned with respect to the wire holes 11g. Two pan coils 12b are wound around and fixedly mounted on the two pan coil attachment portions 12a. Further, the pan coil attachment plate 13 is formed with two pan coil attachment portions 13a, and a shaft hole 13c for passing through the support shaft 17. Two pan coils 13b are wound around and fixedly mounted on the pan coil attachment portions 13a.

The suspension wire fixing substrates 14a, 14b are circuit substrates made of a glass epoxy resin or a like material. The suspension wire fixing substrates 14a, 14b are respectively formed with two terminal holes 14c for passing through the suspension wires 16a, 16b, and two terminal holes 14d for passing through the suspension wires 16c, 16d (see FIG. 2B). As will be described later, the pan coils 12b, 13b, and a conductive wire for supplying a current to the LED 18 are electrically connected to the suspension wires 16a through 16d at the positions of the terminal holes 14c, 14d by soldering or a like process. The suspension wire fixing substrates 14a, 14b are fixedly mounted on the substrate attachment portions 12c, 12d of the pan coil attachment plate 12 by adhesion in such a manner that the two terminal holes 14c, 14d and the wire holes 12e, 12f are aligned with each other.

The suspension wire fixing substrate 15 is a circuit substrate made of a glass epoxy resin or a like material, and has flexibility. The suspension wire fixing substrate 15 is formed with two terminal holes 15a for passing through the suspension wires 16a, 16b, two terminal holes 15b for passing through the suspension wires 16c, 16d, three terminal holes 15c for passing through the suspension wires 26a through 26c, and three terminal holes 15d for passing through the suspension wires 26d through 26f (see FIG. 1). The three terminal holes 15c, 15d have a diameter slightly larger than the diameter of the suspension wires 26a through 26f to wind the suspension wires 26a through 26f with a curved shape, as well as the wire holes 11h, 11i.

Referring to FIG. 2C, the suspension wire fixing substrate 15 is formed with circuit patterns P1, P2 for electrically connecting between the two terminal holes 15a and two of the three terminal holes 15c. The suspension wire fixing substrate 15 is further formed with circuit patterns P3, P4 for electrically connecting between the two terminal holes 15b and two of the three terminal holes 15d. By soldering between these terminal holes, and the suspension wires 16a through 16d and the suspension wires 26a, 26b, 26d, 26e passing through the respective corresponding terminal holes, the suspension wires 16a through 16d, and the suspension wires 26a, 26b, 26d, 26e are electrically connected to each other via the above circuit patterns. As will be described later, the left and right tilt coils 11b, and the suspension wires 26c, 26f are electrically connected to each other by soldering or a like process at the positions of the remaining one of the three terminal holes 15c and the remaining one of the three terminal holes 15d.

Referring back to FIG. 2A, the suspension wire fixing substrate 15 is fixedly mounted on the mirror unit frame 11 by adhesion in such a manner that the terminal holes 15a and the wire holes 11f, the terminal holes 15b and the wire holes 11g, the terminal holes 15c and the wire holes 11h, and the terminal holes 15d and the wire holes 11i are aligned with each other.

The suspension wires 16a through 16d are made of phosphor bronze, beryllium copper or a like material, and have excellent electrical conductivity and spring property. The suspension wires 16a through 16d have a circular shape in cross section. The suspension wires 16a through 16d have the same shape and property as each other, and as will be described later, are used to supply a current to the pan coils 12b, 13b and the LED 18, and to exert stable load in pivotally moving the mirror 19 in Pan direction. The suspension wires 16a through 16d substantially do not expand or contract, even if a force is applied to the suspension wires 16a through 16d in the length direction thereof.

The support shaft 17 is formed with a hole 17a for receiving an LED substrate fixing arm 18b, holes 17b, 17c for passing through conductive wires for electrically connecting between the pan coils 13b and the LED 18, and a step portion 17d for receiving the mirror 19. Further, the inside of the support shaft 17 is formed hollow to pass through the conductive wires for electrically connecting between the pan coils 13b and the LED 18. As will be described later, the support shaft 17 is used as a pivot shaft for pivotally moving the mirror 19 in Pan direction.

The LED 18 is of a diffusive type (a wide-directivity type), and is capable of diffusing light in a wide range. As will be described later, diffused light from the LED 18 is used to detect a scanning position of scanning laser light within a target area. The LED 18 is mounted on an LED substrate 18a. The LED substrate 18a is adhesively mounted on the LED substrate fixing arm 18b, and thereafter, is mounted in the hole 17a of the support shaft 17.

In assembling the mirror unit 10, after the mirror 19 is received in the support shaft 17, bearings 17e and poly-slider washers 17f are mounted on shaft portions at both ends of the support shaft 17. Then, in this state, the two bearings 17e are received in the grooves 11e formed in the mirror unit frame 11. Further, the support shaft 17 is vertically passed through the shaft hole 12g in the pan coil attachment plate 12 and the shaft hole 13c in the pan coil attachment plate 13, and is fixedly mounted threat by adhesion.

Thereafter, the suspension wires 16a, 16b are passed through the terminal holes 15a in the suspension wire fixing substrate 15 via the two terminal holes 14c in the suspension wire fixing substrate 14a, the two wire holes 12e, and the two wire holes 11f. Likewise, the suspension wires 16c, 16d are passed through the terminal holes 15b in the suspension wire fixing substrate 15 via the two terminal holes 14d in the suspension wire fixing substrate 14b, the two wire holes 12f, and the two wire holes 11g. The suspension wires 16a, 16b are soldered to the suspension wire fixing substrates 14a, 15, and the suspension wires 16c, 16d are soldered to the suspension wire fixing substrates 14b, 15, with the conductive wires for supplying a current to the pan coils 12b, 13b and the LED 18.

With the above arrangement, as shown in FIG. 1, the assembling of the mirror unit 10 is completed. In this state, the mirror 19 is made pivotally movable about an axis of the support shaft 17 in Pan direction. The suspension wire fixing substrates 14a, 14b are pivotally moved in Pan direction, as the mirror 19 is pivotally moved in Pan direction. The assembled mirror unit 10 is housed in an opening of a magnet unit frame 21. A manner as to how a current is supplied using the suspension wires will be described later, referring to FIGS. 9A through 9C.

Referring back to FIG. 1, the magnet unit 20 is provided with the magnet unit frame 21, eight pan magnets 22, eight tilt magnets 23, two support shafts 24, a suspension wire fixing substrate 25, the suspension wires 26a through 26f, and a protection cover 27.

The magnet unit frame 21 is constituted of a frame member having a rectangular shape in front view. The magnet unit frame 21 is formed with a shaft hole 21a for passing through the corresponding support shaft 24, and screw holes 21b for fixedly mounting the support shaft 24 in the middle on each of left and right surfaces thereof. Two screw holes 21c are formed in a top surface of the magnet unit frame 21 for fixedly mounting the suspension wire fixing substrate 25. Further, four flange portions projecting toward the inside of the magnet unit frame 21 are formed at front ends of top and bottom inner surfaces of the magnet unit frame 21. A screw hole 21d for fixedly mounting the protection cover 27 is formed in each of the four flange portions. Likewise, four flange portions projecting toward the inside of the magnet unit frame 21 are formed at rear ends of the top and bottom inner surfaces of the magnet unit frame 21. A screw hole 21e for fixedly mounting a servo unit frame 31 is formed in each of the four flange portions.

Figure 3:
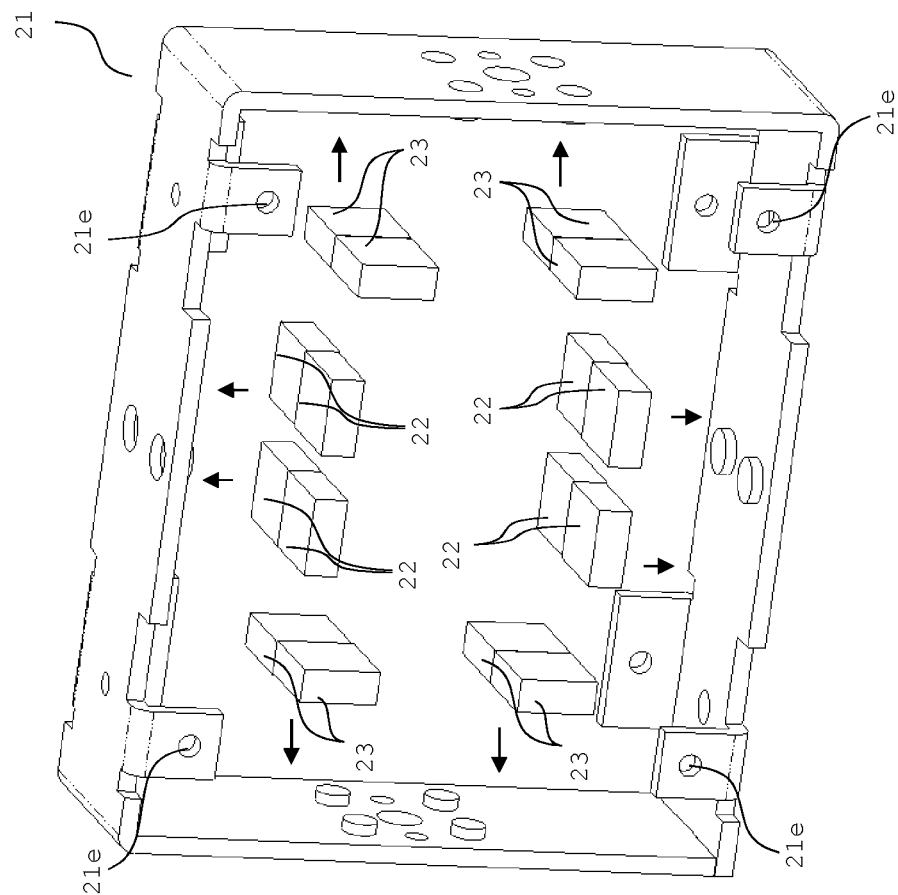
FIG. 3 is a diagram showing the process of assembling the mirror actuator in the embodiment.

FIG. 3 is a perspective view of the magnet unit frame 21 when viewed from a rear side. Referring to FIG. 3, the eight pan magnets 22 are attached to the top and bottom inner surfaces of the magnet unit frame 21. Further, the eight tilt magnets 23 are attached to left and right inner surfaces of the magnet unit frame 21.

Referring back to FIG. 1, each of the two support shafts 24 is formed with two screw holes 24b. The two support shafts 24 are received in the bearings 11d of the mirror unit frame 11 via the shaft holes 21a formed in the magnet unit frame 21 in a state that poly-slider washers 24a are mounted. In this state, two screws 24c are screwed into the two screw holes 21b in the magnet unit frame 21 via the two screw holes 24b. With this arrangement, the two support shafts 24 are fixedly mounted on the magnet unit frame 21. As will be described later, the support shafts 24 are used as rotating shafts for pivotally moving the mirror 19 in Tilt direction.

The suspension wire fixing substrate 25 is formed with two screw holes 25a, and three terminal holes 25c, 25d for passing through the suspension wires 26a through 26f. The three terminal holes 25c, 25d have a diameter slightly larger than the diameter of the suspension wires 26a through 26f for winding the suspension wires 26a through 26f with a curved shape. The suspension wire fixing substrate 25 is formed with a circuit pattern for supplying a signal to the terminal holes 25c, 25d.

The suspension wires 26a through 26f are made of e.g. phosphor bronze, beryllium copper or a like material, and have excellent electrical conductivity and spring property. The suspension wires 26a through 26f have a circular shape in cross section. The suspension wires 26a through 26f have the same shape and property as each other, and as will be described later, are used to supply a current to the tilt coils 11b, the pan coils 12b, 13b and the LED 18, and to exert stable load in pivotally moving the mirror 19 in Tilt direction. The suspension wires 26a through 26f substantially do not expand or contract, even if a force is applied to the suspension wires 26a through 26f in the length direction thereof.

In assembling the magnet unit 20, the suspension wire fixing substrate 25 is mounted on the top surface of the magnet unit frame 21. In this state, two screws 25b are screwed into the two screw holes 21c via the two screw holes 21a. With this arrangement, the suspension wire fixing substrate 25 is fixedly mounted on the magnet unit frame 21.

Thereafter, the suspension wires 26a through 26c are passed through the terminal holes 15c (see FIG. 2A) in the suspension wire fixing substrate 15 via the three terminal holes 25c in the suspension wire fixing substrate 25, and the three wire holes 11h in the mirror unit frame 11. Likewise, the suspension wires 26d through 26f are passed through the three terminal holes 15d (see FIG. 2A) in the suspension wire fixing substrate 15 via the three terminal holes 25d in the suspension wire fixing substrate 25, and the three wire holes 11i in the mirror unit frame 11.

Thereafter, the suspension wires 26a through 26f are soldered to the suspension wire fixing substrates 15, 25 with the conductive wires for supplying a current to the pan coils 12b, 13b and the LED 18. The suspension wires 26a through 26f are wound with a curved shape in a direction away from the mirror 19. Specifically, upper ends of the suspension wires 26a through 26f are fixedly received in the terminal holes 25c, 25d in such a manner as to be inclined rearwardly, as the suspension wires 26a through 26f are away from the terminal holes 25c, 25d. Likewise, lower ends of the suspension wires 26a through 26f are fixedly received in the wire holes 11h, 11i and the terminal holes 15b, 15c in such a manner as to be inclined rearwardly, as the suspension wires 26a through 26f are away from the wire holes 11h, 11i and the terminal holes 15b, 15c. With this arrangement, a structural body shown in FIGS. 4A, 4B is completed. In this state, the mirror unit frame 11 is made pivotally movable in Tilt direction about axes of the support shafts 24. The suspension wire fixing substrate 15 is pivotally moved in Tilt direction, as the mirror unit frame 11 is pivotally moved in Tilt direction.

FIGS. 4A, 4B are perspective views of the structural body in a state that the mirror unit 10 is mounted on the magnet unit 20. FIG. 4A is a perspective view of the structural body when viewed from a front side in FIG. 1, and FIG. 4B is a perspective view of the structural body when viewed from a rear side in FIG. 1.

Referring to FIG. 4B, ends of the suspension wire 16a are connected to the inner one of the two terminal holes 14c, and to the inner one of the two terminal holes 15a. Likewise, ends of the suspension wire 16c are connected to the inner one of the two terminal holes 14d, and to the inner one of the two terminal holes 15b.

Ends of the suspension wire 16b are connected to the outer one of the two terminal holes 14c, and to the outer one of the two terminal holes 15a. Likewise, ends of the suspension wire 16d are connected to the outer one of the two terminal holes 14d, and to the outer one of the two terminal holes 15b.

Ends of the suspension wire 26a are connected to the inner one of the three terminal holes 25c, and to the inner one of the three terminal holes 15c. Likewise, ends of the suspension wire 26d are connected to the inner one of the three terminal holes 25d, and to the inner one of the three terminal holes 15d.

Ends of the suspension wire 26b are connected to the middle one of the three terminal holes 25c, and to the middle one of the three terminal holes 15c. Likewise, ends of the suspension wire 26e are connected to the middle one of the three terminal holes 25d, and to the middle one of the three terminal holes 15d.

Ends of the suspension wire 26c are connected to the outer one of the three terminal holes 25c, and to the outer one of the three terminal holes 15c. Likewise, ends of the suspension wire 26f are connected to the outer one of the three terminal holes 25d, and to the outer one of the three terminal holes 15d.

In FIG. 4A, the reference sign 25e indicates terminals. A drive signal for driving the mirror 19 in Pan direction and in Tilt direction, and a drive signal for turning the LED 18 on are supplied via the terminals 25e. Each of the terminals 25e is connected to the corresponding one of the terminal holes 25c, 25d via the circuit pattern formed on the suspension wire fixing substrate 25.

Referring back to FIG. 1, the servo unit 30 is provided with the servo unit frame 31, a pinhole attachment bracket 32, a pinhole plate 33, a PSD substrate 34, and a PSD 35.

The servo unit frame 31 is constituted of a frame member having a rectangular shape in front view. The servo unit frame 31 is formed with two screw holes 31a for fixedly mounting the pinhole attachment bracket 32 in each of left and right surfaces thereof. Further, four flange portions projecting toward the inside of the servo unit frame 31 are formed at front ends of top and bottom inner surfaces of the servo unit frame 31. A screw hole 31c is formed in each of the four flange portions. Likewise, four flange portions projecting toward the inside of the servo unit frame 31 are formed at rear ends of the left and right inner surfaces of the servo unit frame 31. A screw hole 31e is formed in each of the four flange portions.

The pinhole attachment bracket 32 is formed with two screw holes 32a in each of left and right surfaces thereof. The pinhole attachment bracket 32 is formed, on a back surface thereof, with two screw holes 32b for fixedly mounting the pinhole plate 33, and an opening 32c for guiding servo light emitted from the LED 18 to the PSD 35 via a pinhole 33a.

The pinhole plate 33 is formed with the pinhole 33a and two screw holes 33b. The pinhole 33a is adapted to pass through a part of diffused light emitted from the LED 18.

The PSD substrate 34 is formed with four screw holes 34a for fixedly mounting the PSD substrate 34 on the servo unit frame 31. The PSD 35 is mounted on the PSD substrate 34. The PSD 35 outputs a signal depending on a light receiving position of servo light.

In assembling the servo unit 30, the pinhole plate 33 is mounted on the back surface of the pinhole attachment bracket 32. In this state, two screws 33c are screwed into the two screw holes 32b via the two screw holes 33b. With this arrangement, the pinhole plate 33 is fixedly mounted on the pinhole attachment bracket 32.

Next, the pinhole attachment bracket 32 is housed in the servo unit frame 31. In this state, the four screw holes 31a and the four screw holes 32a are aligned with each other, and four screws 31b are screwed into the screw holes 31a and the screw holes 32a from the left side and the right side. With this arrangement, the pinhole attachment bracket 32 is fixedly mounted on the servo unit frame 31.

Figure 5B:
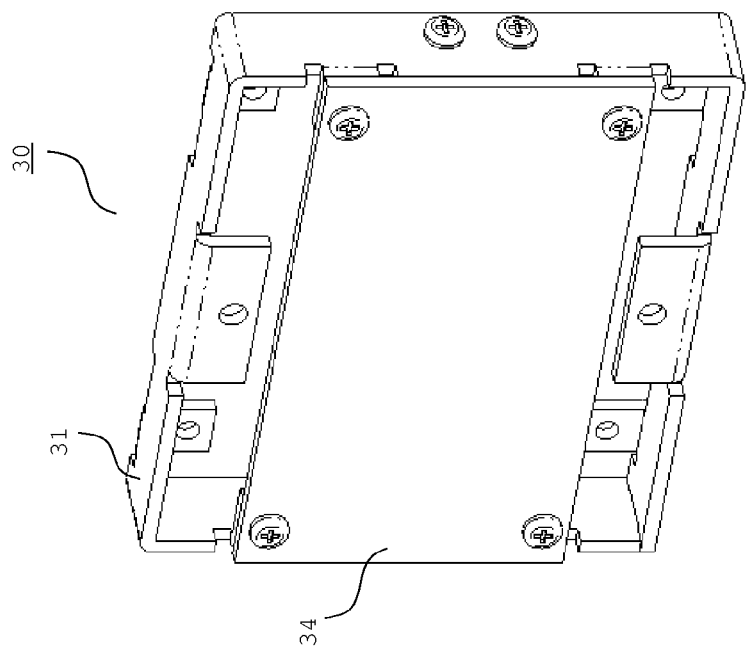
FIGS. 5A and 5B are diagrams showing the process of assembling the mirror actuator in the embodiment.
Figure 5A:
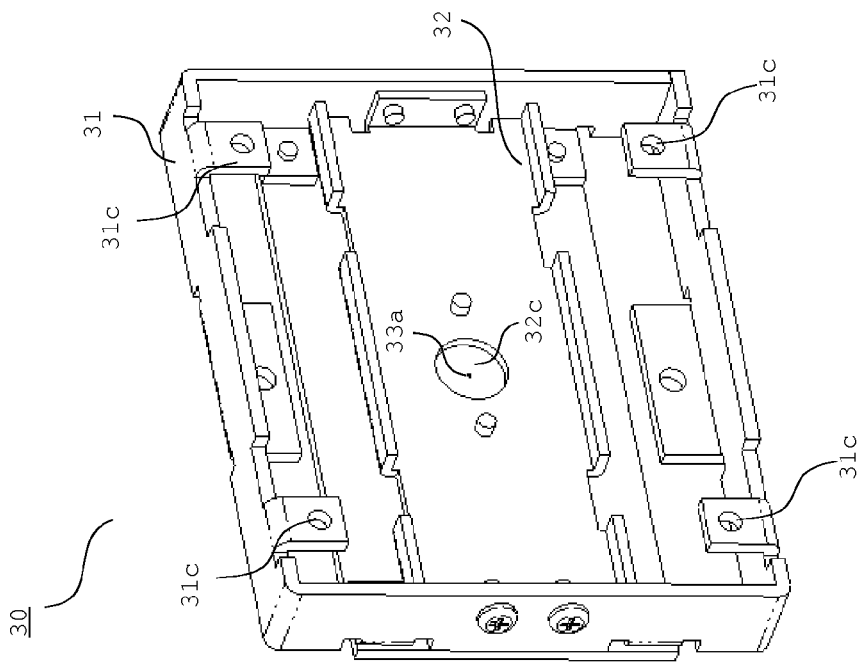

Further, the PSD substrate 34 is mounted on a back portion of the servo unit frame 31. In this state, four screws 34b are screwed into the four screw holes 31e via the four screw holes 34a. With this arrangement, the PSD substrate 34 is fixedly mounted on the servo unit frame 31. In this way, the servo unit 30 shown in FIGS. 5A, 5B is completed. FIG. 5A is a perspective view of the assembled servo unit 30 when viewed from a front side, and FIG. 5B is a perspective view of the assembled servo unit 30 when viewed from a rear side.

Figure 6A:
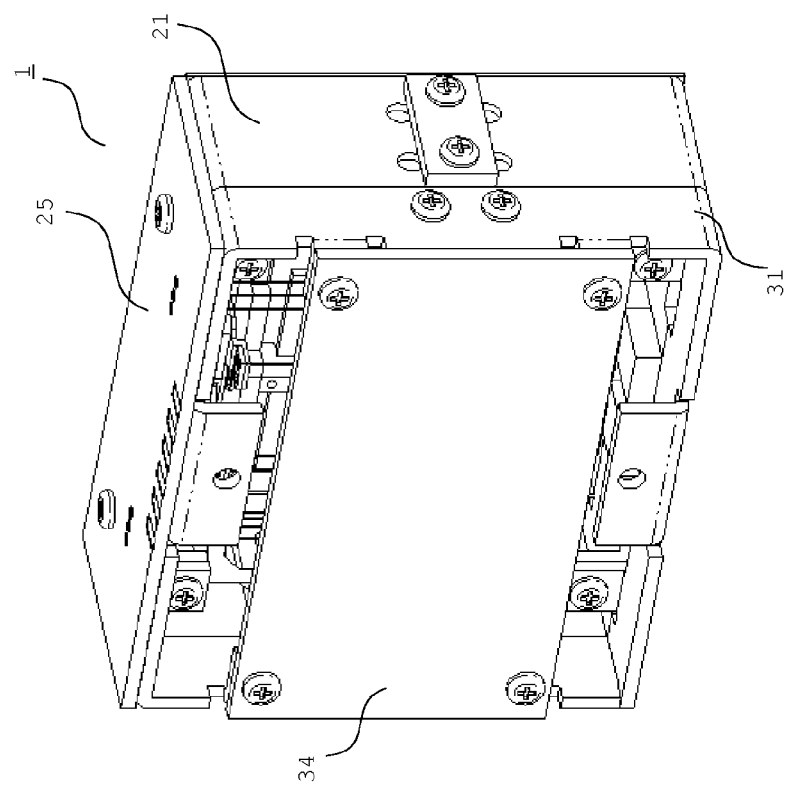
FIGS. 6A and 6B are diagrams showing the process of assembling the mirror actuator in the embodiment.
Figure 6B:
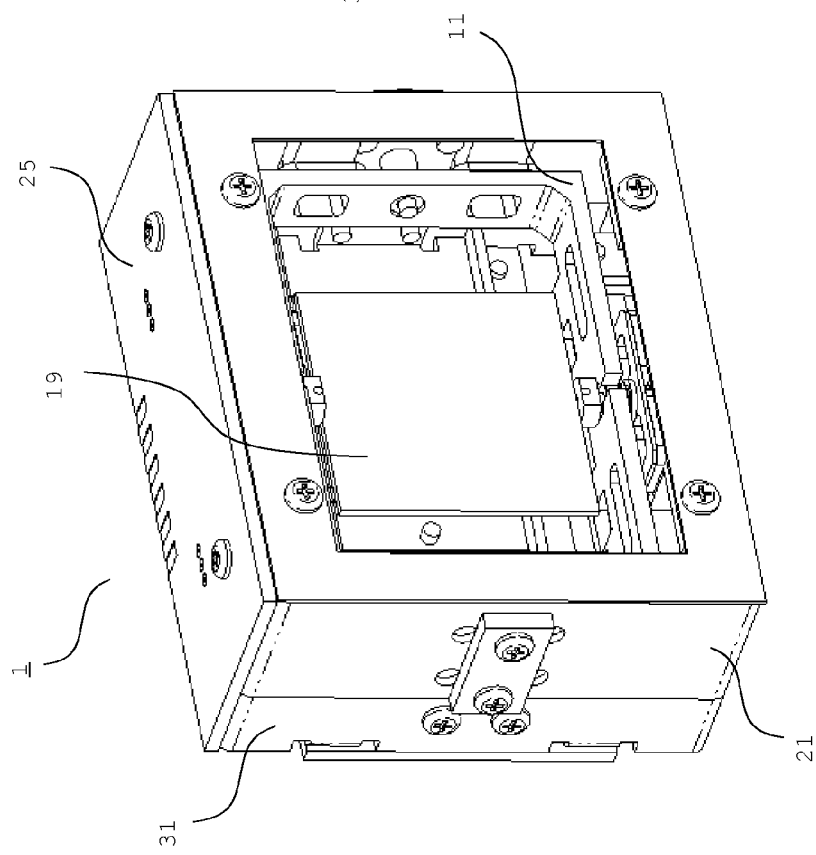

After the servo unit 30 is assembled as described above, the servo unit 30 is mounted on the back portion of the structural body shown in FIGS. 4A, 4B. In this state, the four screws 31d are screwed into the four screw holes 21e in the magnet unit frame 21 from a rear side via four screw holes 31c in the servo unit frame 31. With this arrangement, the servo unit 30 is fixedly mounted on the structural body shown in FIGS. 4A, 4B. Thus, as shown in FIGS. 6A, 6B, the assembling of the mirror actuator 1 is completed. FIG. 6A is a perspective view of the mirror actuator 1 when viewed from a front side, and FIG. 6B is a perspective view of the mirror actuator 1 when viewed from a rear side.

FIGS. 7A through 7C are diagrams showing a relationship between forces acting in pivotally moving the mirror 19. In FIGS. 7A through 7C, to simplify the description, there are shown only the pan coil attachment plate 12, the suspension wire fixing substrates 14a, 14b, the suspension wire fixing substrate 15, the suspension wire fixing substrate 25, the mirror unit frame 11, the support shaft 17, the support shafts 24, the mirror 19, the suspension wires 16a through 16d, and the suspension wires 26a through 26f.

FIG. 7A is a diagram showing an initial state of the mirror actuator 1. The mirror 19 is configured in such a manner that a mirror surface of the mirror 19 is set to a position perpendicular to front and rear directions in FIG. 1, in the case where a current is not applied to the tilt coils 11b and the pan coils 12b, 13b. Hereinafter, the position of the mirror 19 in the above state is called as a "neutral position". The suspension wires 26a through 26f are wound with a curved shape in a direction away from the mirror 19 to provide a margin necessary for pivotally moving the mirror unit frame 11 in Tilt direction. In this state, a force is not applied to the movable portion from the suspension wires 16a through 16d and the suspension wires 26a through 26f. Accordingly, a force for pivotally moving the mirror 19 is not generated.

FIG. 7B is a diagram showing a state that the mirror actuator 1 is driven in Pan direction. The eight pan magnets 22 (see FIG. 3) have the dispositions and the polarities thereof adjusted in such a manner that a force for pivotally moving the pan coil attachment plates 12, 13 about the axis of the support shaft 17 is generated in the pan coil attachment plates 12, 13 by applying a current to the pan coils 12b, 13b (see FIG. 2A). With this arrangement, when a current is applied to the pan coils 12b, 13b, the support shaft 17 is pivotally moved with the pan coil attachment plates 12, 13 by an electromagnetic driving force generated in the pan coils 12b, 13b, whereby the mirror 19 is pivotally moved about the axis of the support shaft 17. The pivot direction of the mirror 19 about the axis of the support shaft 17 is called as Pan direction.

When the mirror 19 is pivotally moved about the axis of the support shaft 17, the suspension wire fixing substrates 14a, 14b mounted on the pan coil attachment plate 12 are pivotally moved with the mirror 19. On the other hand, the suspension wire fixing substrate 15 is fixedly mounted on the mirror unit frame 11, and is kept to the state shown in FIG. 7A. As a result, the suspension wires 16a, 16b, and the suspension wires 16c, 16d are positioned to a torsional position with respect to the support shaft 17, while being pulled in the length direction thereof.

Accordingly, a moment in a direction opposite to the pivot direction of the mirror 19 about the axis of the support shaft 17 i.e. Pan direction is generated by a spring property of the suspension wires 16a through 16d. The moment has a predetermined value computable based on the spring constant of the suspension wires 16a through 16d and the pivot position of the mirror 19 about the axis of the support shaft 17. As described above, since a moment in the direction opposite to Pan direction is constantly generated in a state that the mirror 19 is pivotally moved in Pan direction, the mirror 19 is returned to the neutral position shown in FIG. 7A in response to stopping application of a current to the pan coils 12b, 13b.

FIG. 7C is a diagram showing a state that the mirror actuator 1 is driven in Tilt direction. The eight tilt magnets 23 (see FIG. 3) have the dispositions and the polarities thereof adjusted in such a manner that a force for pivotally moving the mirror unit frame 11 about the axes of the support shafts 24 is generated in the mirror unit frame 11 by applying a current to the tilt coils 11b (see FIG. 2A). With this arrangement, when a current is applied to the tilt coils 11b, the mirror unit frame 11 is pivotally moved about the axes of the support shafts 24 by an electromagnetic driving force generated in the tilt coils 11b, whereby the mirror 19 is pivotally moved with the mirror unit frame 11. The pivot direction of the mirror 19 about the axes of the support shafts 24 is called as Tilt direction.

When the mirror unit frame 11 is pivotally moved about the axes of the support shafts 24, the suspension wire fixing substrates 14a, 14b mounted on the mirror unit frame 11, and the suspension wire fixing substrate 15 are pivotally moved with the mirror unit frame 11. On the other hand, the suspension wire fixing substrate 25 is fixedly mounted on the magnet unit frame 21, and is kept to the state shown in FIG. 7A. As a result, the suspension wires 26a through 26f are deformed from the state shown in FIG. 7A, and a restoring force for restoring the suspension wires 26a through 26f to the state shown in FIG. 7A is generated in the suspension wires 26a through 26f. Accordingly, a moment in a direction opposite to the pivot direction of the mirror unit frame 11 about the axes of the support shafts 24 i.e. Tilt direction is generated by the restoring force. The moment has a predetermined value computable based on the spring constant of the suspension wires 26a through 26f and the pivot position of the mirror unit frame 11 about the axes of the support shafts 24. As described above, since a moment in the direction opposite to Tilt direction is constantly generated in a state that the mirror unit frame 11 is pivotally moved in Tilt direction, the mirror unit frame 11 is returned to the neutral position shown in FIG. 7A in response to stopping application of a current to the tilt coils 11b.

The suspension wires 26a through 26f substantially do not expand or contract. However, since the suspension wires 26a through 26f are wound with a curved shape in a direction away from the mirror 19, it is possible to pivotally move the mirror 19 in Tilt direction.

Thus, when the mirror 19 is pivotally moved in Pan direction and in Tilt direction, a certain resisting force is generated at each of the pivot positions by the spring property of the suspension wires. It is possible to pivotally move the mirror 19 in a stable manner by adjusting a driving force for pivotally moving the mirror 19, depending on the resisting force. Further, in the case where a current is not applied, the mirror 19 is set to the neutral position by the spring property of the suspension wires. The above arrangement enables to prevent the mirror from being set to an uncertain pivot position by disturbances such as vibrations.

Further, it is possible to drive the mirror 19 of a large size with a high response by configuring the mirror actuator 1 as described above. Accordingly, it is possible to receive reflected light from a target area by the mirror 19 of a large size.

FIG. 8A is a partially rear view of the structural body showing a state that the suspension wires 16a through 16d, 26a through 26f are connected to the mirror unit frame 11, when viewed from a rear side. FIG. 8B is a partially enlarged view schematically showing a force acting on the suspension wire fixing substrate 15 in pivotally moving the mirror 19 in Pan direction. FIG. 8C is a partially enlarged view of the pan coil attachment plate 12 and the vicinity thereof, when viewed from obliquely rearwardly. In FIGS. 8A through 8C, to simplify the description, only the members necessary for describing a connecting status between the mirror unit frame 11 and the suspension wires 16a through 16d, 26a through 26f are shown.

As shown in FIG. 8A, the suspension wire fixing substrate 15 has a certain clearance (indicated by the broken line) with respect to the mirror unit frame 11, and only the outer two teeth portions of the mirror unit frame 11, in which the wire holes 11h and the wire holes 11i are formed, are fixedly mounted on the suspension wire fixing substrate 15 by an adhesive agent. The certain clearance is defined by the thickness of the adhesive agent, and is set to about several millimeters.

Since the suspension wires 16a through 16d substantially do not expand or contract, the substrate attachment portions 12c, 12d of the pan coil attachment plate 12 corresponding to an upper portion of the mirror unit frame 11, and the suspension wire fixing substrate 15 corresponding to a lower portion of the mirror unit frame 11 are pulled in a direction toward each other by a force for pivotally moving the mirror 19 in Pan direction. As described above, the substrate attachment portions 12c, 12d of the pan coil attachment plate 12 which are connected to one ends of the suspension wires 16a through 16d are configured to have excellent resistance against flexure, and the suspension wire fixing substrate 15 which is connected to the other ends of the suspension wires 16a through 16d is configured to have flexibility. With this arrangement, in response to pivotal movement of the mirror 19 in Pan direction, the substrate attachment portions 12c, 12d and the suspension wire fixing substrate 15 are pulled in a direction toward the mirror unit frame 11 by the suspension wires 16a through 16d, and then, as shown in FIG. 8B, the suspension wire fixing substrate 15 is flexed in a direction toward the mirror unit frame 11. Since there is formed a certain clearance between the suspension wire fixing substrate 15 and the mirror unit frame 11, the suspension wire fixing substrate 15 is allowed to flex in a direction toward the mirror unit frame 11 within the clearance. For instance, in the case where the mirror 19 is pivotally moved in Pan direction by 90 degrees, the suspension wire fixing substrate 15 is flexed accompanied by pivotal movement of the mirror 19 by the magnitude corresponding to about 1 mm or less, and thus a load exerted on the suspension wire fixing substrate 15 is made small.

Further, as shown in FIG. 8C, the suspension wires 16a through 16d are fixedly connected in such a manner that the pan coil attachment plate 12 is pressed against the top surface of the mirror unit frame 11 via the poly-slider washers 17f and the bearings 17e. Specifically, movement of the pan coil attachment plate 12 in a direction away from the mirror unit frame 11 is restricted by the suspension wires 16a through 16d, and movement of the pan coil attachment plate 12 in a direction toward the mirror unit frame 11 is restricted by the resisting force of the mirror unit frame 11. Thus, movement of the pan coil attachment plate 12 in the axis direction of the support shaft 17 is restricted.

Further, a thickness T1 (see FIG. 8A) of the upper portion of the mirror unit frame 11 is set to a larger thickness than the thickness (e.g. a lower portion T2) of the other portion of the mirror unit frame 11. With this arrangement, as the mirror 19 is pivotally moved in Pan direction, the pan coil attachment plate 12 is pulled by the suspension wires 16a through 16d, and even if a large force is exerted from the pan coil attachment plate 12 in a direction toward the mirror unit frame 11, there is no likelihood that the mirror unit frame 11 may flex. Thus, even if a large force is exerted on the top surface of the mirror unit frame 11 by pivotal movement of the mirror 19 in Pan direction, movement of the support shaft 17 in the axis direction is restricted.

Furthermore, as shown in FIG. 8C, the pan coil attachment plate 12 is contacted only with top surfaces of the poly-slider washers 17f. Accordingly, the contact area of the pan coil attachment plate 12 with the poly-slider washers 17f is made small, as compared with the case where the pan coil attachment plate 12 is directly contacted with the mirror unit frame 11. The above arrangement makes a frictional force generated between the pan coil attachment plate 12 and the mirror unit frame 11 small.

As described above, when the mirror 19 is pivotally moved in Pan direction, the suspension wire fixing substrate 15 corresponding to the lower portion of the mirror unit frame 11 constantly flexes in a direction toward the mirror unit frame 11, with respect to the pan coil attachment plate 12 and the top surface of the mirror unit frame 11. Accordingly, it is possible to smoothly and pivotally move the mirror 19 in Pan direction, even with use of the suspension wires 16a through 16d which substantially do not expand or contract.

Further, as described above, movement of the support shaft 17 in the axis direction is restricted, and the pan coil attachment plate 12 is pressed against the mirror unit frame 11 via the poly-slider washers 17f (see FIG. 8C) having a small frictional force. Accordingly, it is possible to pivotally move the mirror 19 in Pan direction stably and smoothly.

Figure 9A:
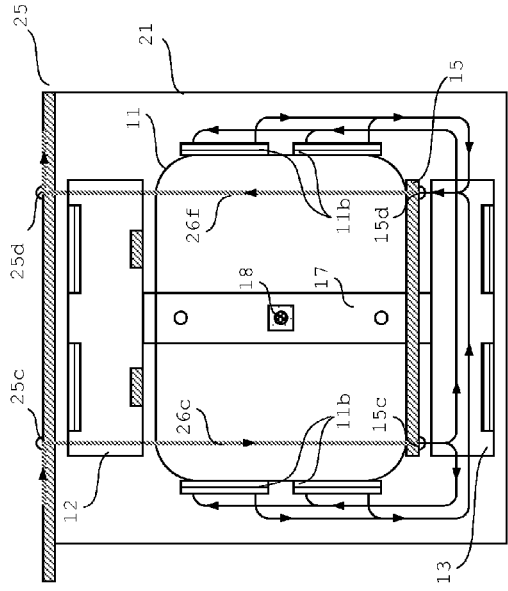
FIGS. 9A through 9C are diagrams showing a manner as to how a current is supplied to the mirror actuator in the embodiment.
Figure 9B:
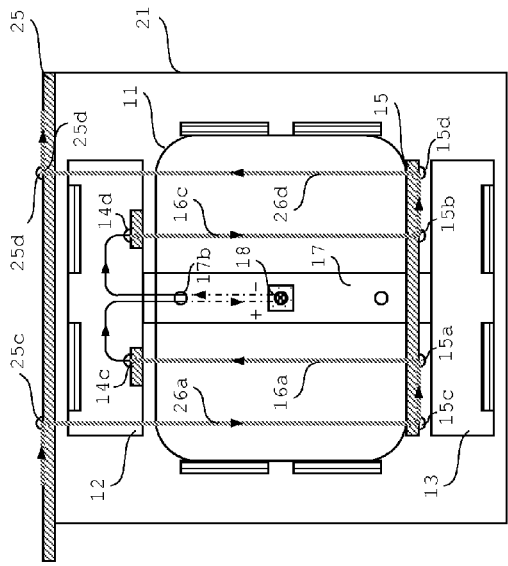
Figure 9C:
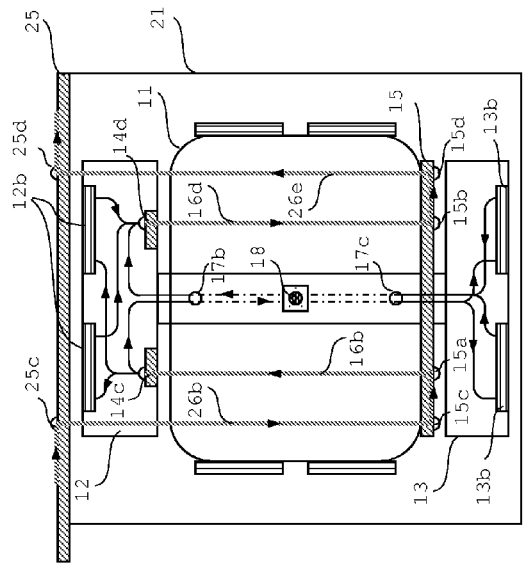

FIGS. 9A through 9C are diagrams showing a manner as to how a current is supplied to the LED 18, the tilt coils 11b and the pan coils 12b, 13b, using the suspension wires 16a through 16d and the suspension wires 26a through 26f. In FIGS. 9A through 9C, to simplify the description, only the mirror unit frame 11, the pan coil attachment plates 12, 13, the pan coils 12b, 13b, the tilt coils 11b, the suspension wire fixing substrates 14a, 14b, the suspension wire fixing substrate 15, the suspension wires 16a through 16d, the support shaft 17, the LED 18, the magnet unit frame 21, the suspension wire fixing substrate 25, and the suspension wires 26a through 26f are shown; and the illustration of some of the suspension wires 16a through 16d and the suspension wires 26a through 26f, which are not necessary in supplying a current to the respective parts, is omitted.

FIG. 9A is a diagram showing a manner as to how a current is supplied to the LED 18.

The suspension wire fixing substrate 25 is formed with a circuit pattern configured in such a manner that one of the three terminal holes 25c is connected to an outflow terminal of a servo LED driving circuit 302 (see FIG. 12) via the corresponding one of the terminals 25e (see FIG. 4A), and that one of the three terminal holes 25d is connected to an inflow terminal of the servo LED driving circuit 302 (see FIG. 12) via the corresponding one of the terminals 25e. Likewise, the suspension wire fixing substrate 15 is formed with a circuit pattern configured in such a manner that one of the three terminal holes 15c is connected to one of the two terminal holes 15a, and that one of the two terminal holes 15b is connected to one of the three terminal holes 15d.

The plus terminal of the LED 18 is electrically connected to the corresponding one of the terminal holes 14c via the hollow formed in the support shaft 17 and the hole 17b by a conductive wire. Further, the minus terminal of the LED 18 is electrically connected to the corresponding one of the terminal holes 14d via the hollow formed in the support shaft 17 and the hole 17b by a conductive wire.

A current outputted from the outflow terminal of the servo LED driving circuit 302 (see FIG. 12) flows through the suspension wire 26a connected to the corresponding one of the terminal holes 25c, the corresponding one of the terminal holes 15c, the corresponding one of the terminal holes 15a, and the suspension wire 16a, and reaches the corresponding one of the terminal holes 14c. Then, the current is inputted to the plus terminal of the LED 18 via a conductive wire connected to the corresponding one of the terminal holes 14c. After reaching the LED 18, the current flows through a conductive wire connected to the minus terminal of the LED 18, and reaches the corresponding one of the terminal holes 14*d*. Thereafter, the current flows through the suspension wire 16*c*, the corresponding one of the terminal holes 15*b*, the corresponding one of the terminal holes 15*d*, and the suspension wire 26*d*, and reaches one of the terminal holes 25*d*, and then is outputted to the inflow terminal of the servo LED driving circuit 302 (see FIG. 12) through the corresponding one of the terminal holes 25*d*. In this way, a current is supplied to the LED 18.

FIG. 9B is a diagram showing a manner as to how a current is supplied to the pan coils 12*b*, 13*b*.

The suspension wire fixing substrate 25 is formed with a circuit pattern configured in such a manner that one of the three terminal holes 25*c* is connected to a Pan-driving outflow terminal of an actuator driving circuit 303 (see FIG. 12) via the corresponding one of the terminals 25*e* (see FIG. 4A), and that one of the three terminal holes 25*d* is connected to a Pan-driving inflow terminal of the actuator driving circuit 303 (see FIG. 12) via the corresponding one of the terminals 25*e*. Likewise, the suspension wire fixing substrate 15 is formed with a circuit pattern configured in such a manner that one of the three terminal holes 15*c* is connected to one of the two terminal holes 15*a*, and that one of the two terminals holes 15*b* is connected to one of the three terminal holes 15*d*.

One ends of the two pan coils 12*b* are electrically connected to the terminal holes 14*c*, and the other ends thereof are electrically connected to the terminal holes 14*d*. Likewise, one ends of the two pan coils 13*b* are electrically connected to the terminal holes 14*c* via the hollow formed in the support shaft 17 and the holes 17*b*, 17*c*, and the other ends thereof are electrically connected to the terminal holes 14*d* via the hollow formed in the support shaft 17 and the holes 17*b*, 17*c*.

A current outputted from the Pan-driving outflow terminal of the actuator driving circuit 303 (see FIG. 12) flows through the suspension wire 26*b* connected to the corresponding one of the terminal holes 25*c*, the corresponding one of the terminal holes 15*c*, the corresponding one of the terminal holes 15*a*, and the suspension wire 16*b*, and reaches the corresponding one of the terminal holes 14*c*. Then, the current is inputted to the one ends of the pan coils 12*b*, 13*b* by four parallel connection. After flowing through the pan coils 12*b*, 13*b*, the current merges in one of the terminal holes 14*d*. Thereafter, the current flows through the suspension wire 16*d*, the corresponding one of the terminal holes 15*b*, the corresponding one of the terminal holes 15*d*, and the suspension wire 26*e*, and reaches the corresponding one of the terminal holes 25*d*, and then is outputted to the Pan-driving inflow terminal of the actuator driving circuit 303 (see FIG. 12) through the corresponding one of the terminal holes 25*d*. In this way, a current is supplied to the pan coils 12*b*, 13*b*.

FIG. 9C is a diagram showing how a current is supplied to the tilt coils 11*b*.

The suspension wire fixing substrate 25 is formed with a circuit pattern configured in such a manner that one of the three terminal holes 25*c* is connected to a Tilt-driving outflow terminal of the actuator driving circuit 303 (see FIG. 12) via the corresponding one of the terminals 25*e* (see FIG. 4A), and that one of the three terminal holes 25*d* is connected to a Tilt-driving outflow terminal of the actuator driving circuit 303 (see FIG. 12) via the corresponding one of the terminals 25*e*. Likewise, the suspension wire fixing substrate 15 is formed with a circuit pattern configured in such a manner that one of the three terminal holes 15*c* is connected to one of the two terminal holes 15*d*. One ends of the four tilt coils 11*b* are electrically connected to the terminal holes 15*c*, and the other ends thereof are electrically connected to the terminal holes 15*d*.

A current outputted from the Tilt-driving outflow terminal of the actuator driving circuit 303 (see FIG. 12) flows through the suspension wire 26*b* connected to the corresponding one of the terminal holes 25*c*, the corresponding one of the terminal holes 15*c*, the corresponding one of the terminal holes 15*a*, and the suspension wire 16*b*, and reaches the corresponding one of the terminal holes 14*c*. Then, the current is inputted to the one ends of the pan coils 12*b*, 13*b* by four parallel connection. After flowing through the pan coils 12*b*, 13*b*, the current merges in one of the terminal holes 14*d*. Thereafter, the current flows through the suspension wire 16*d*, the corresponding one of the terminal holes 15*b*, the corresponding one of the terminal holes 15*d*, and the suspension wire 26*e*, and reaches the corresponding one of the terminal holes 25*d*, and then is outputted to the Tilt-driving inflow terminal of the actuator driving circuit 303 (see FIG. 12) through the corresponding one of the terminal holes 25*d*. In this way, a current is supplied to the tilt coils 11*b*.

As described above, by properly disposing the suspension wires, it is possible to supply a current to the LED 18, the pan coils 12*b*, 13*b* and the tilt coils 11*b*, without using a cable, a harness or a like member to be connected from an external device, and without exerting unstable load on the mirror unit frame 11 and the support shaft 17.

Figure 10:
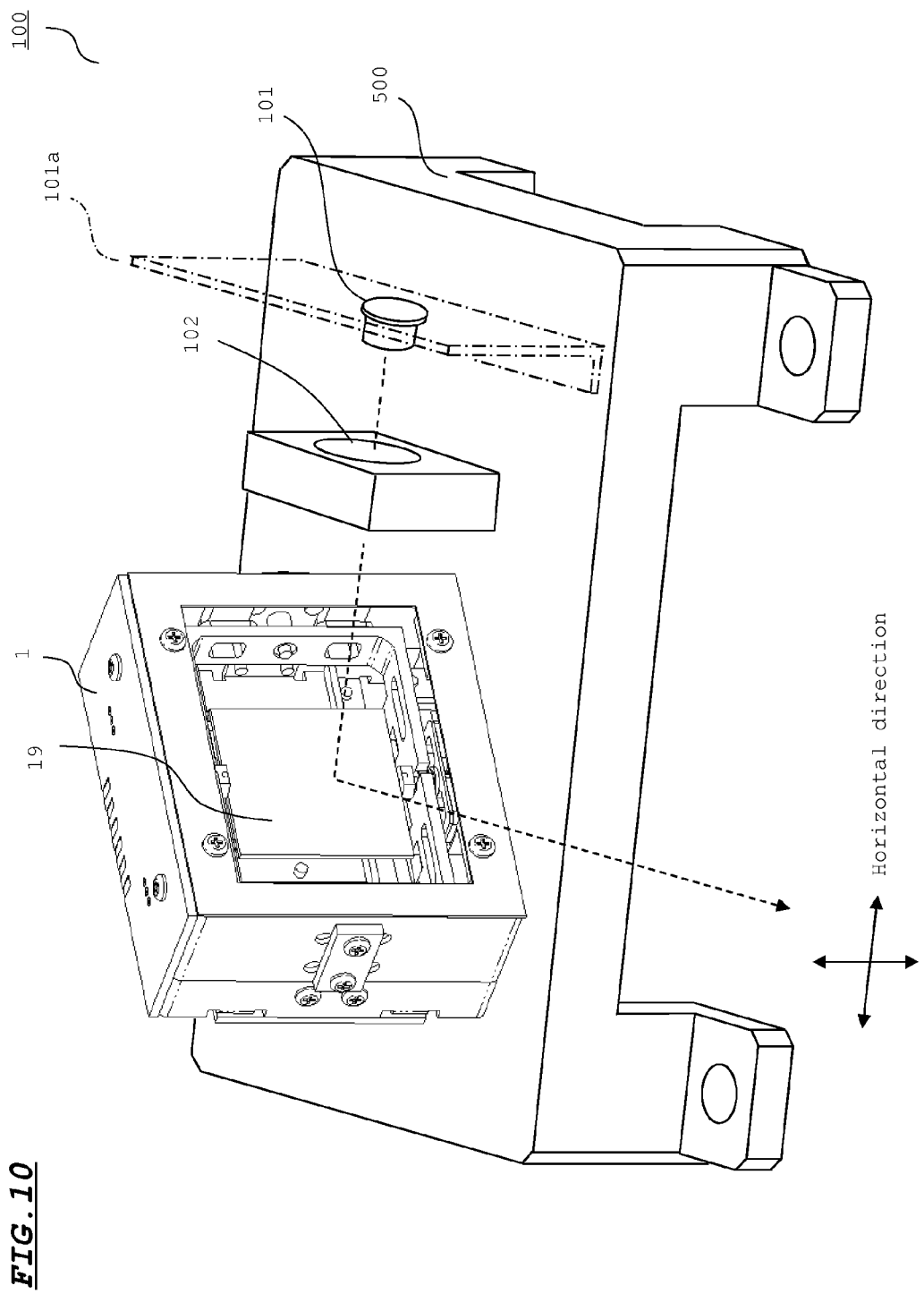
FIG. 10 is a diagram showing an arrangement of a beam irradiation device embodying the invention.

FIG. 10 is a diagram showing an arrangement of an optical system in a state that the mirror actuator 1 is mounted.

Referring to FIG. 10, the reference sign 500 indicates a base member for supporting an optical system. The mirror actuator 1, a laser light source 101, and a beam shaping lens 102 are disposed on a top surface of the base member 500. The laser light source 101 is mounted on a circuit board 101*a* for a laser light source, which is disposed on the top surface of the base member 500.

Laser light emitted from the laser light source 101 is converged by the beam shaping lens 102 in the horizontal direction and in the vertical direction, and is shaped into a certain form on a target area. Laser light transmitted through the beam shaping lens 102 is entered into the mirror 19 of the mirror actuator 1, and is reflected toward the target area by the mirror 19. The target area is scanned with laser light by driving the mirror 19 by the mirror actuator 1.

The mirror actuator 1 is disposed at such a position that scanning laser light from the beam shaping lens 102 is entered into the mirror surface of the mirror 19 with an incident angle of 45 degrees with respect to the horizontal direction, when the mirror 19 is set to the neutral position shown in FIG. 7A. Specifically, when the mirror 19 is set to the neutral position, the mirror surface of the mirror 19 is aligned in parallel to the vertical direction, and scanning laser light is entered into the mirror surface with an incident angle of 45 degrees with respect to the horizontal direction.

Figure 11B:
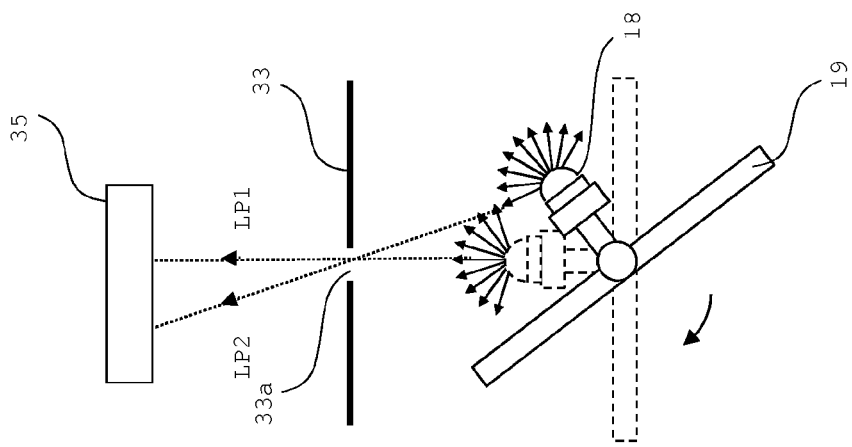
FIGS. 11A and 11B are diagrams for describing an arrangement and an operation of a servo optical system in the embodiment.
Figure 11A:
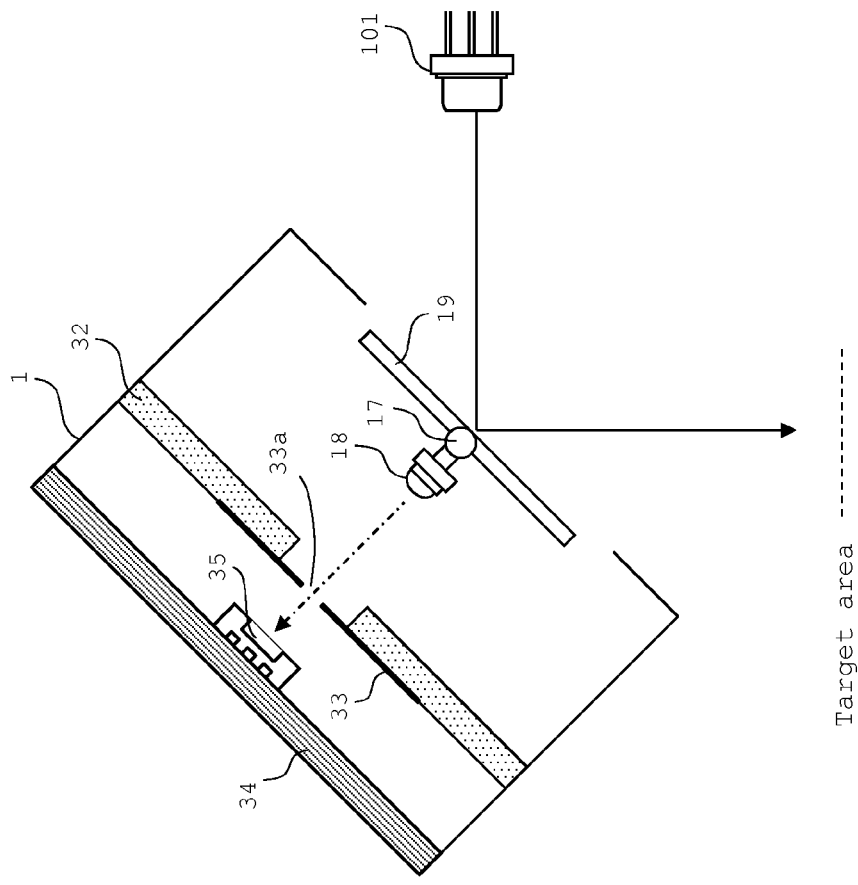

FIG. 11A is a diagram for describing a servo optical system for detecting the position of the mirror 19. FIG. 11A is a schematic perspective view of the optical system shown in FIG. 10 when viewed from the side of the top surface of the base member 500. In FIG. 11A, only a partially cross-sectional view of the mirror actuator 1, and the laser light source 101 are shown.

As described above, the mirror actuator 1 is provided with the LED 18, the pinhole attachment bracket 32, the pinhole plate 33, the PSD substrate 34, and the PSD 35.

The LED 18, the PSD 35, and the pinhole 33*a* are disposed at such positions that the LED 18 faces the pinhole 33*a* in the pinhole plate 33 and the center of the PSD 35, when the mirror 19 of the mirror actuator 1 is set to the neutral position. Specifically, when the mirror 19 is set to the neutral position, the pinhole plate 33 and the PSD 35 are disposed at such positions that servo light emitted from the LED 18 and passing through the pinhole 33a is entered into the center of the PSD 35 in a direction perpendicular to the PSD 35. Further, the pinhole plate 33 is disposed at a position closer to the PSD 35 with respect to the intermediate position between the LED 18 and the PSD 35.

In this example, a part of servo light diffusively emitted from the LED 18 passes through the pinhole 33a, and is received on the PSD 35. Servo light entered into an area of the pinhole plate 33 other than the pinhole 33a is blocked by the pinhole plate 33. The PSD 35 outputs a current signal depending on the light receiving position of servo light.

For instance, as shown in FIG. 11B, in the case where the mirror 19 is pivotally moved in the arrow direction from the neutral position indicated by the broken line, the optical path of light passing through the pinhole 33a, of diffused light (servo light) from the LED 18, is displaced from LP1 to LP2. As a result of the displacement, the irradiation position of servo light on the PSD 35 changes, and a position detection signal to be outputted from the PSD 35 changes. In this case, the emission position of servo light from the LED 18, and the incident position of servo light on the light receiving surface of the PSD 35 have a one-to-one correspondence. Accordingly, it is possible to detect the position of the mirror 19 by the incident position of servo light to be detected by the PSD 35 to thereby detect the scanning position of scanning laser light in a target area.

Further, as described referring to FIGS. 8A through 8C, movement of the support shaft 17 in the axis direction is restricted, and the mirror 19 can be pivotally moved in a stable manner. Accordingly, the position of the LED 18 mounted on the back surface of the mirror 19 is also stabilized. Thus, it is possible to precisely detect the scanning position of scanning laser light in a target area.

Figure 12:
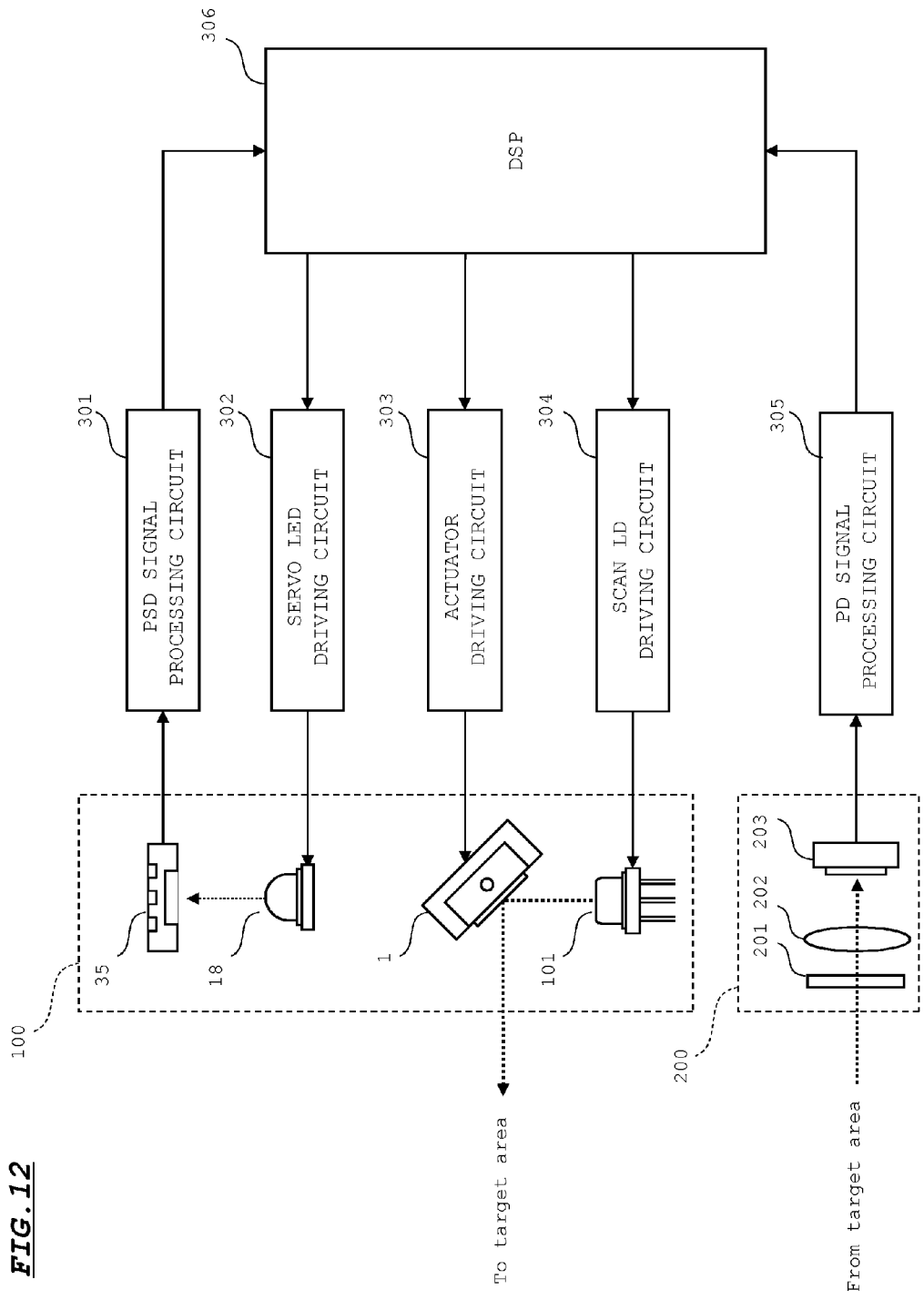
FIG. 12 is a diagram showing a circuit configuration of a laser radar system in the embodiment.

FIG. 12 is a diagram showing a circuit configuration of a laser radar system. As shown in FIG. 12, the laser radar system is provided with a scanning portion 100, a light receiving portion 200, a PSD signal processing circuit 301, the servo LED driving circuit 302, the actuator driving circuit 303, a scan LD driving circuit 304, a PD signal processing circuit 305, and a DSP 306.

The scanning portion 100 is provided with the scanning optical system shown in FIG. 10 and the servo optical system shown in FIG. 11A. In FIG. 12, to simplify the description, only the laser light source 101, the mirror actuator 1, the LED 18, and the PSD 35 are shown as the constituent elements of the scanning portion 100. The light receiving portion 200 is provided with a band-pass filter 201 which transmits only light of a wavelength region corresponding to the wavelength region of laser light to be emitted from the laser light source 101, a light receiving lens 102 which collects scanning laser light reflected on a target area, and a photodetector 203 which receives the collected scanning laser light.

The PSD signal processing circuit 301 generates a position detection signal depending on a light receiving position, based on an output signal from the PSD 35, and outputs the generated position detection signal to the DSP 306.

The servo LED driving circuit 302 supplies a drive signal to the LED 18, based on a signal from the DSP 306. Specifically, servo light of a constant output is outputted from the LED 18 during an operation of the scanning portion 100.

The actuator driving circuit 303 drives the mirror actuator 1, based on a signal from the DSP 306. Specifically, a drive signal for causing laser light to scan along a predetermined trajectory in a target area is supplied to the mirror actuator 1.

The scan LD driving circuit 304 supplies a drive signal to the laser light source 101, based on a signal from the DSP 306. Specifically, the laser light source 101 emits pulse light at a timing at which a scanning position of scanning laser light coincides with a predetermined position in a target area.

The PSD signal processing circuit 305 amplifies a signal from the photodetector 203, converts the amplified signal into a digital signal, and supplies the digital signal to the DSP 306.

The DSP 306 detects a scanning position of scanning laser light in a target area, based on a position detection signal inputted from the PSD signal processing circuit 301; and performs e.g. driving control of the mirror actuator 1 and driving control of the laser light source 101. Further, the DSP 306 judges whether an obstacle is present at an irradiation position of scanning laser light in a target area, based on a signal to be inputted from the PD signal processing circuit 305; and at the same time, measures a distance to the obstacle, based on a time lag between an irradiation timing of the scanning laser light to be outputted from the laser light source 101, and a light receiving timing of reflected light from the target area, which is received by the photodetector 203.

As described above, in the embodiment, when the mirror 19 is pivotally moved in Pan direction and in Tilt direction, a constant and stable resisting force by the spring property of the suspension wires is generated at each of the pivot positions. Accordingly, it is possible to pivotally move the mirror 19 in a stable manner by adjusting a driving force for pivotally moving the mirror 19 depending on the resisting force. Further, in the case where a current is not applied, the mirror 19 is set to the neutral position by the spring property of the suspension wires. Accordingly, it is possible to prevent the mirror from being set to an uncertain pivot position by disturbances such as vibrations.

Further, in the embodiment, a current is supplied to the movable portion via the suspension wires 26a through 26f, the circuit pattern on the suspension wire fixing substrate 25, and the suspension wires 16a through 16d. Accordingly, it is possible to supply a current to the LED 18, the pan coils 12b, 13b and the tilt coils 11b, without using a cable, a harness or a like member which may exert unstable load on the movable portion.

Further, in the embodiment, the suspension wires 26a through 26f and the suspension wires 16a through 16d are disposed at such positions that the suspension wires are aligned with the support shaft 17, specifically, are aligned substantially in parallel to the support shaft 17. With this arrangement, it is possible to reduce a flexure amount of the suspension wires 26a through 26f and the suspension wires 16a through 16d in pivotally moving the mirror 19; and it is possible to prevent exertion of a large force, from the suspension wires 26a through 26f and the suspension wires 16a through 16d, which may restrict pivotal movement of the mirror 19 in pivotally moving the mirror 19. Further, since ends of the suspension wires 26a through 26f and the suspension wires 16a through 16d are positioned near the bottom surface of the mirror unit frame 11, it is possible to easily connect the corresponding suspension wires to each other by the circuit pattern of the suspension wire fixing substrate 25 having a flat planar shape.

Further, in the embodiment, fixation of ends of the suspension wires 26a through 26f and the suspension wires 16a through 16d to the suspension wire fixing substrate 25, and electrical connection between the suspension wires can be performed merely by soldering the ends of the suspension wires 26a through 26f and the suspension wires 16a through 16d to the suspension wire fixing substrate 25.

Further, in the embodiment, as shown in FIG. 6A, the suspension wires 26a though 26f are disposed to flex uniformly in a direction away from the mirror 19, when the mirror 19 is set to the neutral position. With this arrangement, even if the mirror 19 is pivotally moved in Tilt direction from the neutral position, the suspension wires 26a through 26f are deformed altogether in a direction toward or away from the mirror 19. As described above, by restricting the deformation direction of the suspension wires 26a through 26f in one direction, it is possible to stabilize the resisting force generated in the suspension wires 26a through 26f in pivotally moving the mirror 19 in Tilt direction. This is advantageous in stably driving the mirror 19. Furthermore, since the suspension wires 26a through 26f are wound with a curved shape in a direction away from the mirror 19, it is possible to pivotally move the mirror 19 in Tilt direction, even with use of the suspension wires 26a through 26f which substantially do not expand or contract.

Further, in the embodiment, as shown in FIG. 8A, the suspension wire fixing substrate 15 has flexibility, and a certain clearance is formed between the suspension wire fixing substrate 15 and the mirror unit frame 11. With this arrangement, it is possible to pivotally move the mirror 19 in Pan direction in a satisfactory manner, even with use of the suspension wires 16a through 16d which substantially do not expand or contract.

Further, in the embodiment, the pan coil attachment plate 12 is configured to be pressed against the top surface of the mirror unit frame 11 via the bearings 17e and the poly-slider washers 17f, substantially without a clearance, by the suspension wires 16a through 16d. This arrangement suppresses the pan coil attachment plate 12 and the support shaft 17 from moving in the axis direction of the support shaft 17, whereby the mirror 19 can be pivotally moved in a stable manner. Thus, it is also possible to stabilize the position of the LED 18 for servo control, which is mounted on the back surface of the mirror 19, and to precisely detect a scanning position of scanning laser light in a target area.

Further, in the embodiment, the top surface of the mirror unit frame 11 to be pressed by the pan coil attachment plate 12 is formed to have a large thickness, as compared with the other portion of the mirror unit frame 11. Accordingly, it is possible to pivotally move the mirror 19 in a stable manner, without flexure, even if a large force is exerted by pivotal movement of the mirror 19 in Pan direction.

Further, in the embodiment, since the pan coil attachment plate 12 is pressed against the mirror unit frame 11 via the poly-slider washers 17f having a small frictional force, it is possible to pivotally move the mirror 19 smoothly.

The embodiment of the invention has been described as above. The invention is not limited to the foregoing embodiment, and the embodiment of the invention may be modified in various ways other than the above.

For instance, in the embodiment, ten suspension wires in total (the suspension wires 16a through 16d and the suspension wires 26a through 26f) are used. The number of suspension wires is not limited to the above. For instance, in the embodiment, suspension wires which are not used for supplying a current may be additionally provided. Further alternatively, in the case where the LED 18 is not disposed in the movable portion, the suspension wires 26b, 26e may be omitted, and eight suspension wires in total may be provided.

Further, in the embodiment, suspension wires having a circular shape in cross section are used. Alternatively, for instance, suspension wires having a prismatic shape in cross section or plate springs may be used, in place of the circular-shaped suspension wires. Forming the suspension wires into a prismatic shape or a flat planar shape in cross section as described above enables to restrict the bending direction of the suspension wires in one direction. This makes it easy to flex the suspension wires uniformly in one direction in pivotally moving the mirror 19 in Tilt direction. Thus, it is possible to stabilize the resisting force generated in the suspension wires, and to stably drive the mirror 19. For instance, in the case where the suspension wires 26a through 26f are made of a flat planar-shaped flexible member having a certain length, width, thickness, the flexible member is disposed in such a manner that the width direction of the flexible member is aligned with the left and right directions in FIG. 1. This arrangement makes it easy to flex the suspension wires uniformly in the front and rear directions in pivotally moving the mirror 19 in Tilt direction.

In the case where the shape of the suspension wires 26a through 26f is modified as described above, it is not necessarily required to form the suspension wires 26a through 26f into a prismatic shape or a flat planar shape over the entire length thereof. For instance, the suspension wires 26a through 26f may be partly formed into a prismatic shape or a flat planar shape e.g. only at a middle portion thereof.

Further alternatively, as far as the member is capable of exerting a stable resisting force on the movable portion and has conductivity, any member may be used in place of the suspension wires.

Further, in the embodiment, the LED 18 of a diffusive type (a wide-directivity type) is used as a light source for diffusively emitting servo light. Alternatively, an LED of a non-diffusive type may be used. In the modification, a diffusing lens having a light diffusing function may be disposed on the light emission side of the LED of a non-diffusive type. Further alternatively, the LED of a non-diffusive type may be covered with a cap having a light diffusing function.

Further, in the embodiment, the pivot angle of the mirror 19 is detected by the LED 18 which is integrally driven with the mirror 19, the pinhole plate 33 disposed in the mirror actuator 1, and the PSD 35. Alternatively, however, the pivot angle of the mirror 19 may be detected by a semiconductor laser and a PSD disposed on the base member 500. Specifically, laser light emitted from the semiconductor laser and reflected on the mirror 19 may be received on the PSD. Further alternatively, laser light emitted from the semiconductor laser and transmitted through a transparent plate which is integrally driven with the mirror 19 may be received on the PSD.

Further, in the embodiment, ends of the suspension wires 26a through 26f are fixed to the suspension wire fixing substrate 15. Alternatively, the suspension wire fixing substrate 15 may be omitted, and ends of the suspension wires 26a through 26f may be fixed only to the wire holes 11f through 11i. In the modification, a circuit pattern for connecting between the suspension wires 26a, 26b, 26d, 26e, and the suspension wires 16a through 16d may be formed on the bottom surface of the mirror unit frame 11.

Further, in the embodiment, a glass epoxy resin is used as a material for the suspension wire fixing substrate 15. Alternatively, as far as the material has flexibility, any material may be used.

Further, in the embodiment, only the suspension wire fixing substrate 15 is flexed to pivotally move the mirror 19 in Pan direction. Alternatively, as shown in FIG. 13A, it may be possible to configure in such a manner that the suspension wire fixing substrates 14a, 14b and the substrate attachment portions 12c, 12d are flexed, without flexing the suspension wire fixing substrate 15. In the modification, the pan coil attachment plate 12 is configured in such a manner that only the portion corresponding to the substrate attachment portions 12c, 12d is made of a material having flexibility. In the modification, it is possible to pivotally move the mirror 19 in Pan direction, even with use of the suspension wires 16a through 16d which substantially do not expand or contract, as well as the embodiment. Further alternatively, it may be possible to configure in such a manner that both the suspension wire fixing substrate 15, and the suspension wire fixing substrates 14a, 14b, the substrate attachment portions 12c, 12d may be flexed. In both of the modifications, it is desirable to configure in such a manner that the portion of the pan coil attachment plate 12 to be pressed against the mirror unit frame 11 is not flexed to prevent the support shaft 17 from moving.

Further, in the embodiment, a certain clearance is formed between the suspension wire fixing substrate 15 and the mirror unit frame 11 to flex the suspension wire fixing substrate 15 in a direction toward the mirror unit frame 11 in pivotally moving the mirror 19 in Pan direction. Alternatively, as shown in FIG. 13B, it may be possible to configure in such a manner that the mirror unit frame 11 is not formed with the inner two teeth portions having the wire holes 11f, 11g. In the modification, it is also possible to flex the suspension wire fixing substrate 15 in a direction toward the mirror unit frame 11, as well as the embodiment.

Further, in the embodiment, the top surface of the mirror unit frame 11 to be pressed by the pan coil attachment plate 12 is configured to have a large thickness, as compared with the other portion of the mirror unit frame 11, to restrict movement of the support shaft 17 in the axis direction and to pivotally move the mirror 19 in a stable manner. Alternatively, the top surface of the mirror unit frame 11 to be pressed by the pan coil attachment plate 12 may have resistance against flexure by using e.g. a hard material. It is desirable to make the mirror unit frame 11 lightweight as much as possible, with use of a resin or a like material as described in the embodiment, in view of a point that the mirror unit frame 11 is formed into a movable frame.

Further, in the embodiment, the pan coil attachment plate 12 is pressed against the top surface of the mirror unit frame 11 via the bearings 17e and the poly-slider washers 17f. Alternatively, the poly-slider washers 17f may be omitted, or the pan coil attachment plate 12 may be directly abutted against the top surface of the mirror unit frame 11. In the modification, although the surface area of the pan coil attachment plate 12 to be contacted with the mirror unit frame 11 increases, and pivotal movement of the mirror 19 in Pan direction may be made slightly slow, it is possible to restrict movement of the support shaft 17 in the axis direction and to pivotally move the mirror 19 in a stable manner, as well as the embodiment.

Further, in the embodiment, the mirror actuator 1 is configured in such a manner that the mirror unit frame 11 is pivotally moved in Tilt direction and the mirror 19 is pivotally moved in Pan direction with respect to the mirror unit frame 11. Alternatively, the mirror actuator 1 may be configured in such a manner that the mirror unit frame 11 is pivotally moved in Pan direction and the mirror 19 is pivotally moved in Tilt direction with respect to the mirror unit frame 11.

The embodiment of the invention may be changed or modified in various ways as necessary, as far as such changes and modifications do not depart from the scope of the claims of the invention hereinafter defined.

What is claimed is:

1. A mirror actuator, comprising:
a base member;
a first pivot portion which is supported on the base member to be pivotally movable about an axis of a first pivot shaft;
a second pivot portion which is supported on the first pivot portion to be pivotally movable about an axis of a second pivot shaft perpendicular to the first pivot shaft;
a mirror which is disposed in the second pivot portion;
a first coil which is pivotally moved with the first pivot portion;
a second coil which is pivotally moved with the second pivot portion;
a magnet portion which supplies a magnetic field to the first coil and to the second coil;
a plurality of first elastic members which connect between the base member and the first pivot portion, and have flexibility and conductivity;
a plurality of second elastic members which connect between the first pivot portion and the second pivot portion, and have flexibility and conductivity; and
a circuit pattern which connects between one of joint portions between the first elastic members and the first pivot portion, and one of joint portions between the second elastic members and the first pivot portion, wherein
the circuit pattern is configured in such a manner that a current flows from the first elastic member for supplying a signal to the second coil to the second elastic member for supplying a signal to the second coil, and
the first coil is connected to an end of the first elastic member, corresponding to the side of the first pivot portion, for supplying a signal to the first coil, and the second coil is connected to an end of the second elastic member, corresponding to the side of the second pivot portion, for supplying a signal to the second coil.

2. The mirror actuator according to claim 1, wherein the circuit pattern is formed on a fixing member for fixing an end of the first elastic member and an end of the second elastic member to the first pivot portion.

3. The mirror actuator according to claim 1, wherein the first elastic member and the second elastic member are disposed in alignment with the second pivot shaft.

4. The mirror actuator according to claim 3, wherein the first elastic member is disposed to uniformly flex in a certain direction.

5. The mirror actuator according to claim 3, wherein the mirror actuator is configured in such a manner that at least one of connecting portions to be connected to both ends of the second elastic member is flexed when the mirror is pivotally moved about the axis of the second pivot shaft.

6. The mirror actuator according to claim 3, wherein the second pivot portion is pressed against the first pivot portion by the second elastic member.

7. The mirror actuator according to claim 6, wherein the first pivot portion has a portion to be pressed against the second pivot portion, the portion having resistance against flexure.

8. The mirror actuator according to claim 6, further comprising
a sliding contact member which is mounted on the second pivot shaft, wherein
the second pivot portion is pressed against the first pivot portion via the sliding contact member.

9. The mirror actuator according to claim 1, wherein the first elastic member and the second elastic member are suspension wires.

10. A beam irradiation device, comprising:
a mirror actuator; and a laser light source which supplies laser light to a mirror of the mirror actuator, the mirror actuator including:
- a base member;
- a first pivot portion which is supported on the base member to be pivotally movable about an axis of a first pivot shaft;
- a second pivot portion which is supported on the first pivot portion to be pivotally movable about an axis of a second pivot shaft perpendicular to the first pivot shaft;
- the mirror which is disposed in the second pivot portion;
- a first coil which is pivotally moved with the first pivot portion;
- a second coil which is pivotally moved with the second pivot portion;
- a magnet portion which supplies a magnetic field to the first coil and to the second coil;
- a plurality of first elastic members which connect between the base member and the first pivot portion, and have flexibility and conductivity;
- a plurality of second elastic members which connect between the first pivot portion and the second pivot portion, and have flexibility and conductivity; and
- a circuit pattern which connects between one of joint portions between the first elastic members and the first pivot portion, and one of joint portions between the second elastic members and the first pivot portion, wherein the circuit pattern is configured in such a manner that a current flows from the first elastic member for supplying a signal to the second coil to the second elastic member for supplying a signal to the second coil, and the first coil is connected to an end of the first elastic member, corresponding to the side of the first pivot portion, for supplying a signal to the first coil, and the second coil is connected to an end of the second elastic member, corresponding to the side of the second pivot portion, for supplying a signal to the second coil.

11. The beam irradiation device according to claim 10, wherein
the circuit pattern is formed on a fixing member which fixes an end of the first elastic member and an end of the second elastic member to the first pivot portion.

12. The beam irradiation device according to claim 10, wherein
the first elastic member and the second elastic member are disposed in alignment with the second pivot shaft.

13. The beam irradiation device according to claim 12, wherein
the first elastic member is disposed to uniformly flex in a certain direction.

14. The beam irradiation device according to claim 12, wherein
the mirror actuator is configured in such a manner that at least one of connecting portions to be connected to both ends of the second elastic member is flexed when the mirror is pivotally moved about the axis of the second pivot shaft.

15. The beam irradiation device according to claim 12, wherein
the second pivot portion is pressed against the first pivot portion by the second elastic member.

16. The beam irradiation device according to claim 15, wherein
the first pivot portion has a portion to be pressed against the second pivot portion, the portion having resistance against flexure.

17. The beam irradiation device according to claim 15, further comprising
a sliding contact member which is mounted on the second pivot shaft, wherein
the second pivot portion is pressed against the first pivot portion via the sliding contact member.

18. The beam irradiation device according to claim 10, wherein
the first elastic member and the second elastic member are suspension wires.

* * * * *